United States Patent
Purkayastha et al.

(10) Patent No.: US 12,336,026 B2
(45) Date of Patent: Jun. 17, 2025

(54) MULTI RAT D2D, EXTENDING D2D TO INCLUDE 3GPP AND OTHER NON-3GPP RAT / DEVICES

(71) Applicant: INTERDIGITAL PATENT HOLDINGS, INC., Wilmington, DE (US)

(72) Inventors: Debashish Purkayastha, Collegeville, PA (US); Michel Roy, Candiac (CA); Robert Gazda, Spring (PA); Saad Ahmad, Spring (PA); Ulises Olvera-Hernandez, Saint-Lazare (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 440 days.

(21) Appl. No.: 17/920,285

(22) PCT Filed: Apr. 20, 2021

(86) PCT No.: PCT/US2021/028103
§ 371 (c)(1),
(2) Date: Oct. 20, 2022

(87) PCT Pub. No.: WO2021/216510
PCT Pub. Date: Oct. 28, 2021

(65) Prior Publication Data
US 2023/0171824 A1    Jun. 1, 2023

Related U.S. Application Data

(60) Provisional application No. 63/012,663, filed on Apr. 20, 2020.

(51) Int. Cl.
*H04W 76/14*  (2018.01)
*H04W 76/40*  (2018.01)

(52) U.S. Cl.
CPC .......... *H04W 76/14* (2018.02); *H04W 76/40* (2018.02)

(58) Field of Classification Search
CPC ..... H04W 76/14; H04W 76/40; H04W 84/12; H04W 88/04; H04W 4/70
See application file for complete search history.

(56) References Cited

U.S. PATENT DOCUMENTS

2018/0213379 A1* 7/2018 Xiong ...................... H04W 4/70
2020/0178343 A1* 6/2020 Kim ....................... H04W 76/27

OTHER PUBLICATIONS

Cheshire et al., "Dynamic Configuration of IPV4 Link-Local Addresses," Network Working Group, RFC 3927 (May 2005).
(Continued)

*Primary Examiner* — Farid Seyedvosoghi
(74) *Attorney, Agent, or Firm* — VOLPE KOENIG

(57) ABSTRACT

A method for setting up a multiple radio access technology (multi-RAT) device-to-device (D2D) communication is disclosed. An application function (AF) in a wireless transmit/receive unit (WTRU) may identify a group of multiple radio access technology (multi-RAT) capable WTRUs to a policy control function (PCF), wherein one or more multi-RAT capable WTRUs of the group of multi-RAT capable WTRUs register as having enhanced device-to-device (ED2D) functionality. The AF may select a multi-RAT capable WTRU from the group of multi-RAT capable WTRUs having ED2D functionality, as a relay for extended D2D operation. The device with ED2D function will act as Relay for ED2D (RED2D). The PCF may then reconfigure the RED2D with group related information. The RED2D may then configure D2D communication among the group of multi-RAT capable WTRUs.

20 Claims, 21 Drawing Sheets

(56) References Cited

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems - Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Kar et al., "An Overview of Device-to-Device Communication in Cellular Networks," The Korean Institute of Communications and Information Sciences, ICI Express, pp. 203-208 (2018).
Militano et al., "Device-to-Device Communications for 5G Internet of Things," EAI Endorsed Transactions on Internet of Things, vol. 1, Issue 1 (Oct. 2015).
Plummer, "An Ethernet Address Resolution Protocol—or—Converting Network Protocol Addresses to 48.bit Ethernet Address for Transmission on Ethernet Hardware," Network Working Group, RFC 826 (Nov. 1982).
Third Generation Partnership Project, "Technical Specification Group Services and System Aspects; Proximity-based services (ProSe); Stage 2 (Release 15)," 3GPP TS 23.303 V15.1.0 (Jun. 2018).
Third Generation Partnership Project, "Technical Specification Group Services and System Aspects; Proximity-based services (ProSe); Stage 2 (Release 16)," 3GPP TS 23.303 V16.0.0 (Jul. 2020).
Third Generation Partnership Project, "Technical Specification Group Services and System Aspects; General Packet Radio Service (GPRS) enhancements for Evolved Universal Terrestrial Radio Access Network (E-UTRAN) access (Release 16)," 3GPP TS 23.401 V16.6.0 (Mar. 2020).
Third Generation Partnership Project, "Technical Specification Group Core Network and Terminals; Proximity-services (ProSe) User Equipment (UE) to ProSe function protocol aspects; Stage 3 (Release 15)," 3GPP TS 24.334 V15.2.0 (Sep. 2018).
Third Generation Partnership Project, "Technical Specification Group Services and System Aspects; General Packet Radio Service (GPRS) enhancements for Evolved Universal Terrestrial Radio Access Network (E-UTRAN) access (Release 17)," 3GPP TS 23.401 V17.0.0 (Mar. 2021).
Third Generation Partnership Project, "Technical Specification Group Services and System Aspects; General Packet Radio Service (GPRS) enhancements for Evolved Universal Terrestrial Radio Access Network (E-UTRAN) access (Release 16)," 3GPP TS 23.401 V16.10.0 (Mar. 2021).
Third Generation Partnership Project, "Technical Specification Group Services and System Aspects; Group Communication System Enablers for LTE (GCSE_LTE); Stage 2 (Release 15)," 3GPP TS 23.468 V15.1.0 (Sep. 2019).
Third Generation Partnership Project, "Technical Specification Group Services and System Aspects; Group Communication System Enablers for LTE (GCSE_LTE); Stage 2 (Release 16)," 3GPP TS 23.468 V16.0.0 (Jul. 2020).
Third Generation Partnership Project, "Technical Specification Group Core Network and Terminals; Proximity-services (ProSe) Management Objects (MO) (Release 16)," 3GPP TS 24.333 V16.0.0 (Sep. 2019).
Third Generation Partnership Project, "Technical Specification Group Services and System Aspects; Study on system enhancement for Proximity based Services (ProSe) in the 5G System (5GS) (Release 17)," 3GPP TR 23.752 V17.0.0 (Mar. 2021).
Third Generation Partnership Project, "Technical Specification Group Services and System Aspects; Study on system enhancement for Proximity based Services (ProSe) in the 5G System (5GS) (Release 17)," 3GPP TR 23.752 V0.3.0 (Jan. 2020).
Third Generation Partnership Project, "Technical Specification Group Core Network and Terminals; Proximity-services (ProSe) User Equipment (UE) to ProSe function protocol aspects; Stage 3 (Release 17)," 3GPP TS 24.334 V17.1.0 (Mar. 2021).
Third Generation Partnership Project, "Technical Specification Group Radio Access Network; Evolved Universal Terrestrial Radio Access (E-UTRA); Radio Resource Control (RRC); Protocol specification (Release 16)," 3GPP TS 36.331 V16.4.0 (Mar. 2021).
Third Generation Partnership Project, "Technical Specification Group Radio Access Network; Evolved Universal Terrestrial Radio Access (E-UTRA); Radio Resource Control (RRC); Protocol specification (Release 16)," 3GPP TS 36.331 V16.0.0 (Mar. 2020).
Third Generation Partnership Project, "Technical Specification Group Core Network and Terminals; Domain Name System Procedures; Stage 3; (Release 17)," 3GPP TS 29.303 V17.1.0 (Mar. 2021).
Third Generation Partnership Project, "Technical Specification Group Core Network and Terminals; Domain Name System Procedures; Stage 3; (Release 16)," 3GPP TS 29.303 V16.2.0 (Mar. 2020).
Third Generation Partnership Project, "Technical Specification Group Core Network and Terminals; Domain Name System Procedures; Stage 3; (Release 16)," 3GPP TS 29.303 V16.4.0 (Mar. 2021).
Third Generation Partnership Project, "Technical Specification Group Core Network and Terminals; Proximity-services (ProSe) function to ProSe application server aspects (PC2); Stage 3; (Release 16)," 3GPP TS 29.343 V16.0.0 (Jun. 2020).
Third Generation Partnership Project, "Technical Specification Group Core Network and Terminals; Proximity-services (ProSe) function to ProSe application server aspects (PC2); Stage 3; (Release 15)," 3GPP TS 29.343 V15.1.0 (Sep. 2019).
Third Generation Partnership Project, "Technical Specification Group Services and System Aspects; Architecture enhancements for 5G System (5GS) to support Vehicle-to-Everything (V2X) services (Release 16)," 3GPP TS 23.287 V16.5.0 (Dec. 2020).
Third Generation Partnership Project, "Technical Specification Group Services and System Aspects; Architecture enhancements for 5G System (5GS) to support Vehicle-to-Everything (V2X) services (Release 16)," 3GPP TS 23.287 V16.2.0 (Mar. 2020).
Third Generation Partnership Project, "Technical Specification Group Core Network and Terminals; Proximity-services (ProSe) Function to Home Subscriber Server (HSS) aspects; Stage 3 (Release 15)," 3GPP TS 29.344 V15.1.0 (Sep. 2019).
Third Generation Partnership Project, "Technical Specification Group Core Network and Terminals; Proximity-services (ProSe) Function to Home Subscriber Server (HSS) aspects; Stage 3 (Release 16)," 3GPP TS 29.344 V16.0.0 (Jul. 2020).

* cited by examiner

MULTI RAT D2D, EXTENDING D2D TO INCLUDE 3GPP AND OTHER NON-3GPP RAT / DEVICES

CROSS-REFERENCE TO RELATED APPLICATIONS

This application is the U.S. National Stage, under 35 U.S.C. § 371, of International Application No. PCT/US2021/028103 filed Apr. 20, 2021, which claims the benefit of U.S. Provisional Application No. 63/012,663, filed Apr. 20, 2020, the contents of which are incorporated herein by reference.

BACKGROUND

In home immersive gaming in the future, it is anticipated that a plurality of wireless devices and sensors will be used by players. Some of the devices may have dual connectivity capability, such as 3GPP (i.e., 5G) and non-3GPP (i.e., IEEE 801.11, IEEE 802.3, etc.). However, other devices may have only one supported connectivity, such as 3GPP only or non-3GPP only. In a gaming use case, it is anticipated that these devices and sensors will interact among themselves to make the gaming experience more immersive, responsive, and lifelike. Device-to-device (D2D) technology may be utilized in these scenarios where devices and sensors directly communicate among themselves.

It would be beneficial to have D2D communication between two devices of different technology (e.g., 3GPP and non-3GPP) and among multiple devices of different technology (e.g., 3GPP and non-3GPP). The communication should have minimal impact on 5G system and procedures, provide some level of performance and reliability, a similar configuration and management as 3GPP 5G, and provide a single solution which can work for both 1-1 and 1-N communications.

SUMMARY

A method for setting up a multiple radio access technology (multi-RAT) device-to-device (D2D) communication is disclosed. An application function (AF) in a wireless transmit/receive unit (WTRU) may identify a group of multiple radio access technology (multi-RAT) capable WTRUs to a policy control function (PCF), wherein one or more multi-RAT capable WTRUs of the group of multi-RAT capable WTRUs register as having enhanced device-to-device (ED2D) functionality. The AF may select a multi-RAT capable WTRU from the group of multi-RAT capable WTRUs having ED2D functionality, as a relay for extended D2D operation. The device with ED2D function will act as Relay for ED2D (RED2D). The PCF may then reconfigure the RED2D with group related information. The RED2D may then configure D2D communication among the group of multi-RAT capable WTRUs.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
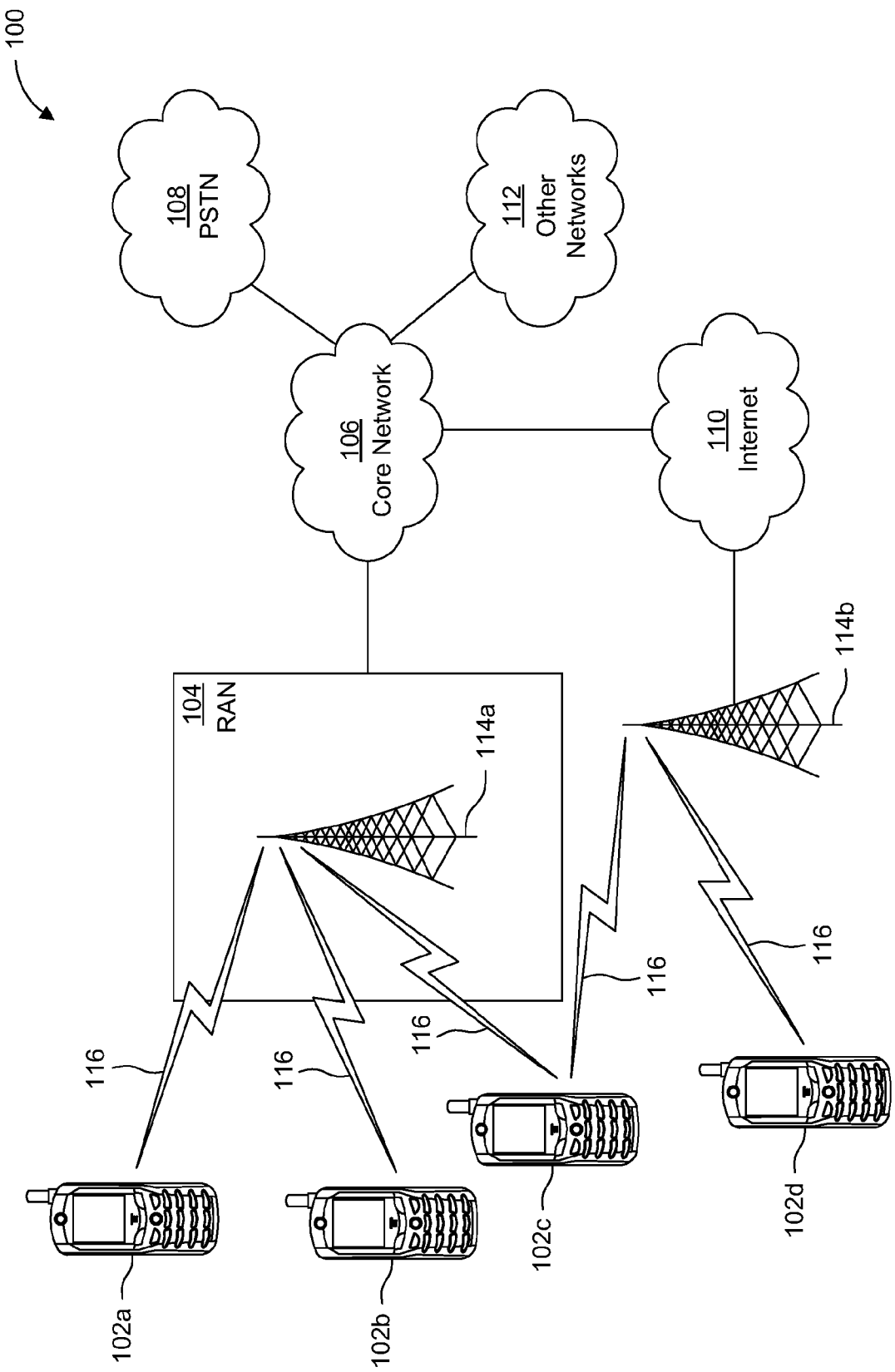
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
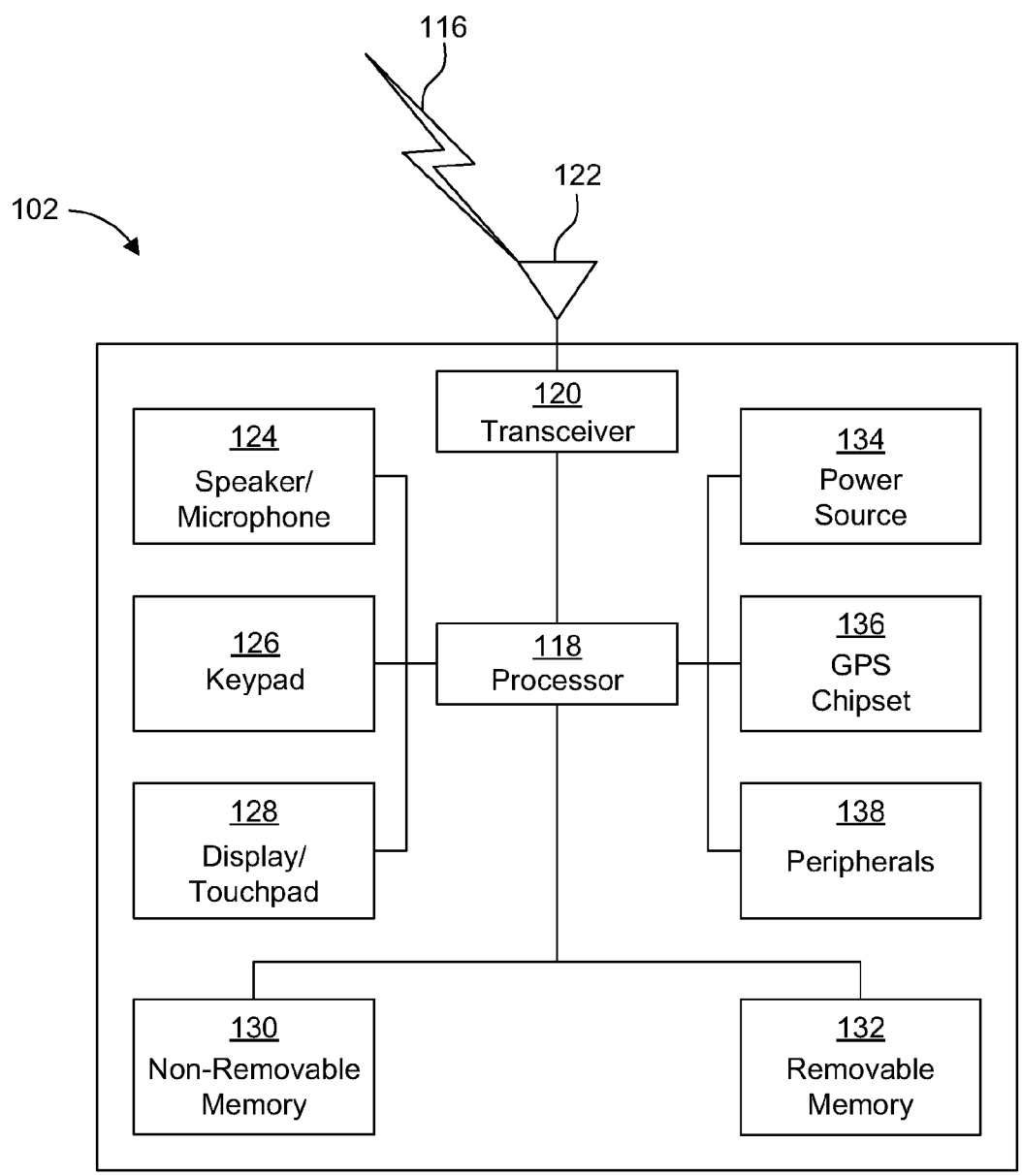
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception).

Figure 1C:
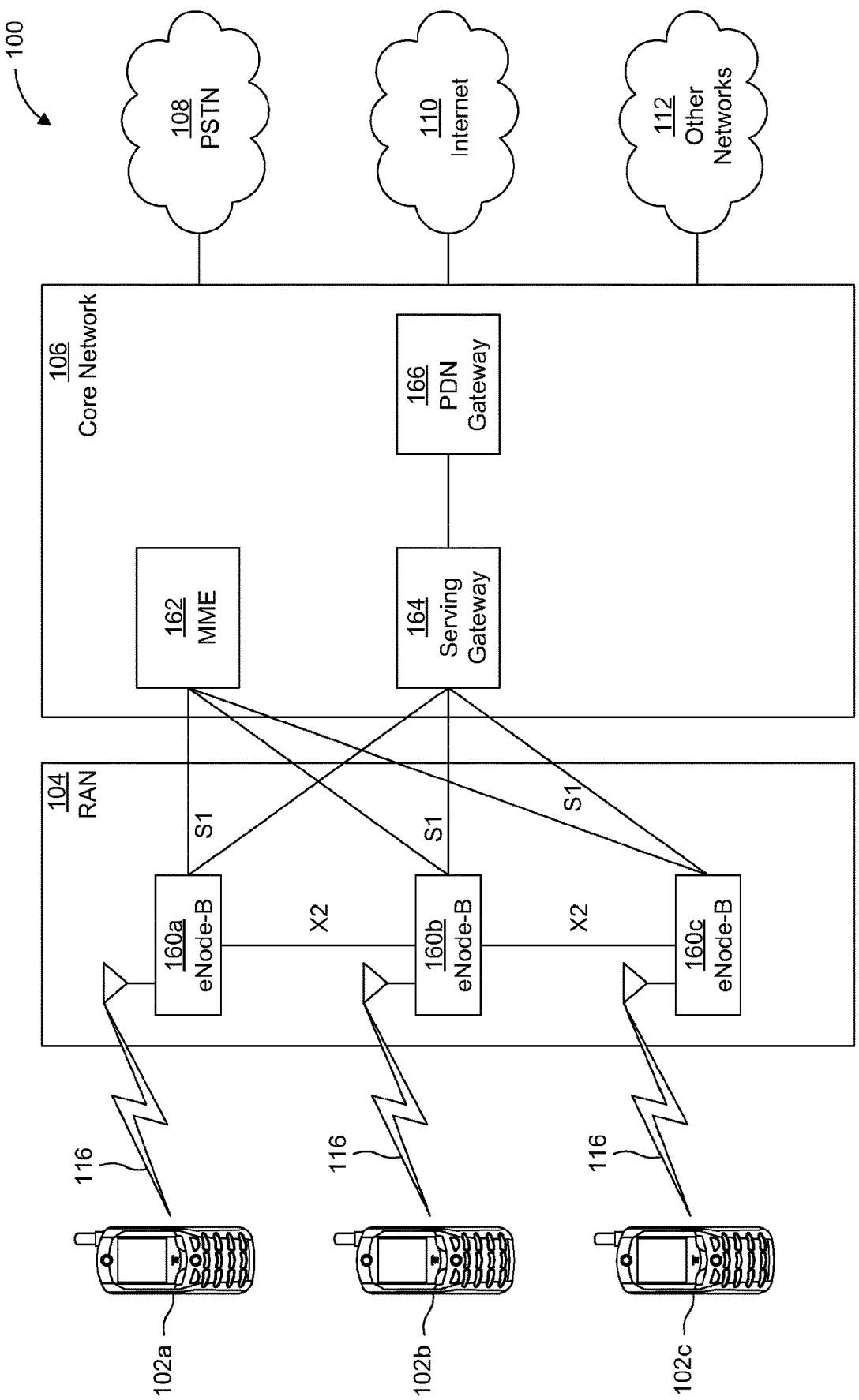
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHZ. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
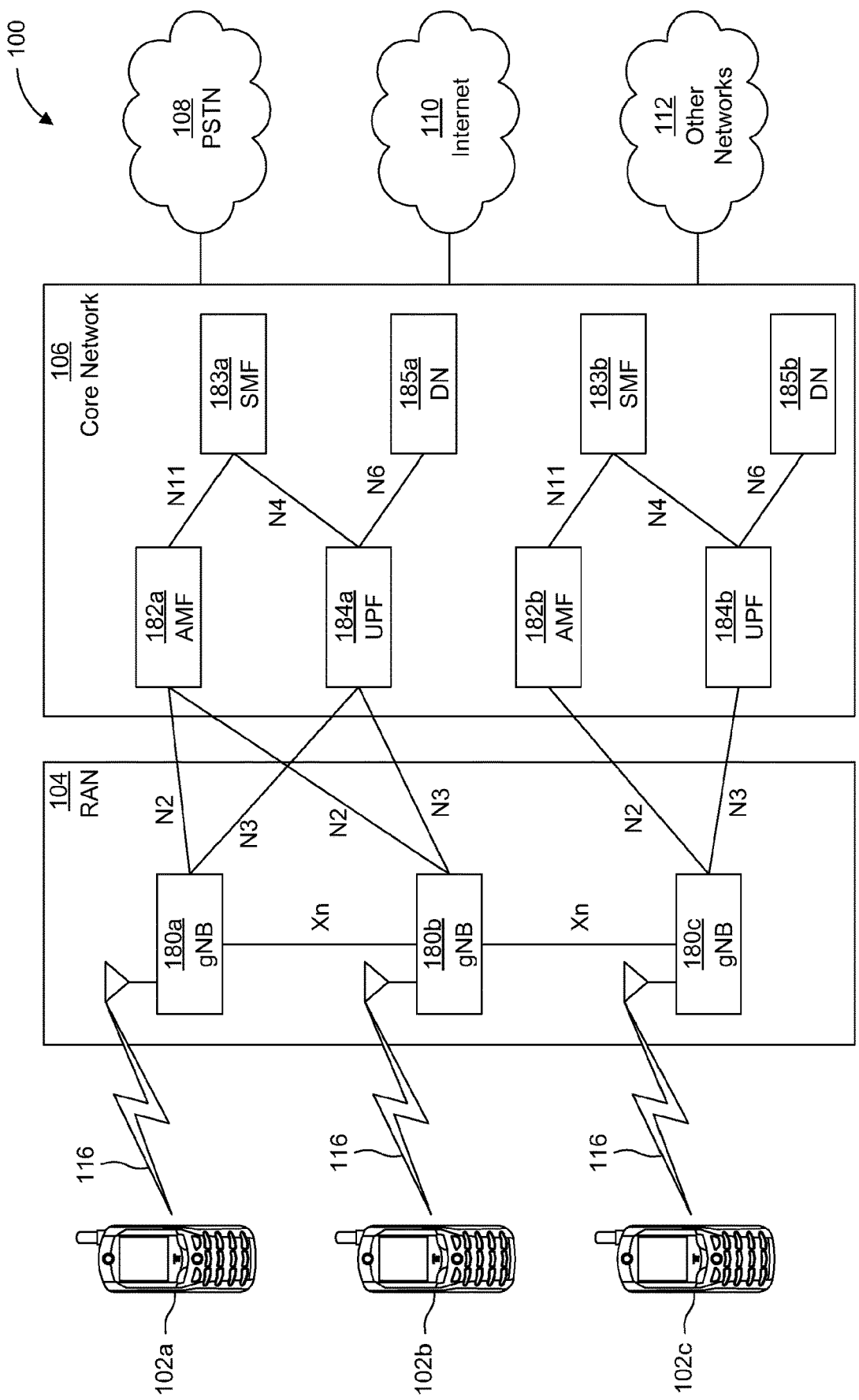
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

5G promises to deliver ultra-fast speeds and responsiveness to connect everything without interruption. This technology has been designed to accommodate the changing needs of connectivity demands.

One of the promises of 5G is the convergence of fixed and mobile networks. This situation is especially challenging in a residential environment (also known as an "in-home" environment) where, in some cases, 5G will augment or displace the existing infrastructures. The introduction of 5G in the residential environment will solve many convergence and quality of service problems that homeowners currently experience.

As 5G is introduced inside the home and enterprise, the "Future Home Immersive Gaming" use case may benefit from 5G services like D2D. It may be useful for gamers to interact inside the home directly, while playing the game, for improved interactivity.

Inside the home or enterprise there exists a private LAN over WiFi or Wired Ethernet. This can be an extension of ISP network (Cable operator, Satellite, DSL, Wired, etc.). Until 5G can completely replace "in-home" networking technologies, these technologies will coexist.

While different technologies co-exist inside the home and internet, it is possible that there may be gaming devices and equipment capable of connecting over both 3GPP (i.e., 5G) and non 3GPP (i.e., IEEE 802.11, IEEE 802.3, etc.) access technologies. Additionally, some devices may exclusively work on only one technology, such as IEEE 802 only. In such cases, non-3GPP devices may not be able to participate in D2D communications with 5G devices.

For Future Home Gaming use case, all-inclusive (3GPP and non-3GPP) D2D service may improve the gaming experience.

The native support of D2D communications becomes crucial in 5G systems where the exponentially increasing data traffic exchanged over radio mobile systems requires novel communications paradigms.

Proximity communications enabled by D2D communications represent a fertile ground for 5G use cases where devices detect their vicinity and subsequently trigger different services, such as social interactions and gaming, advertisements, local information exchange, etc.

Applications that may benefit from D2D services include traffic (e.g., public transportation, fleet management, intelligent transport system (ITS), etc.), smart environments (e.g., smart homes, smart cities, smart industries, etc.), public safety (e.g., rescue team, disaster recovery, etc.), advertisement (e.g., sales, tourism, augmented reality, etc.), proximity-based services (e.g., social networking, gaming, etc.).

Figure 2:
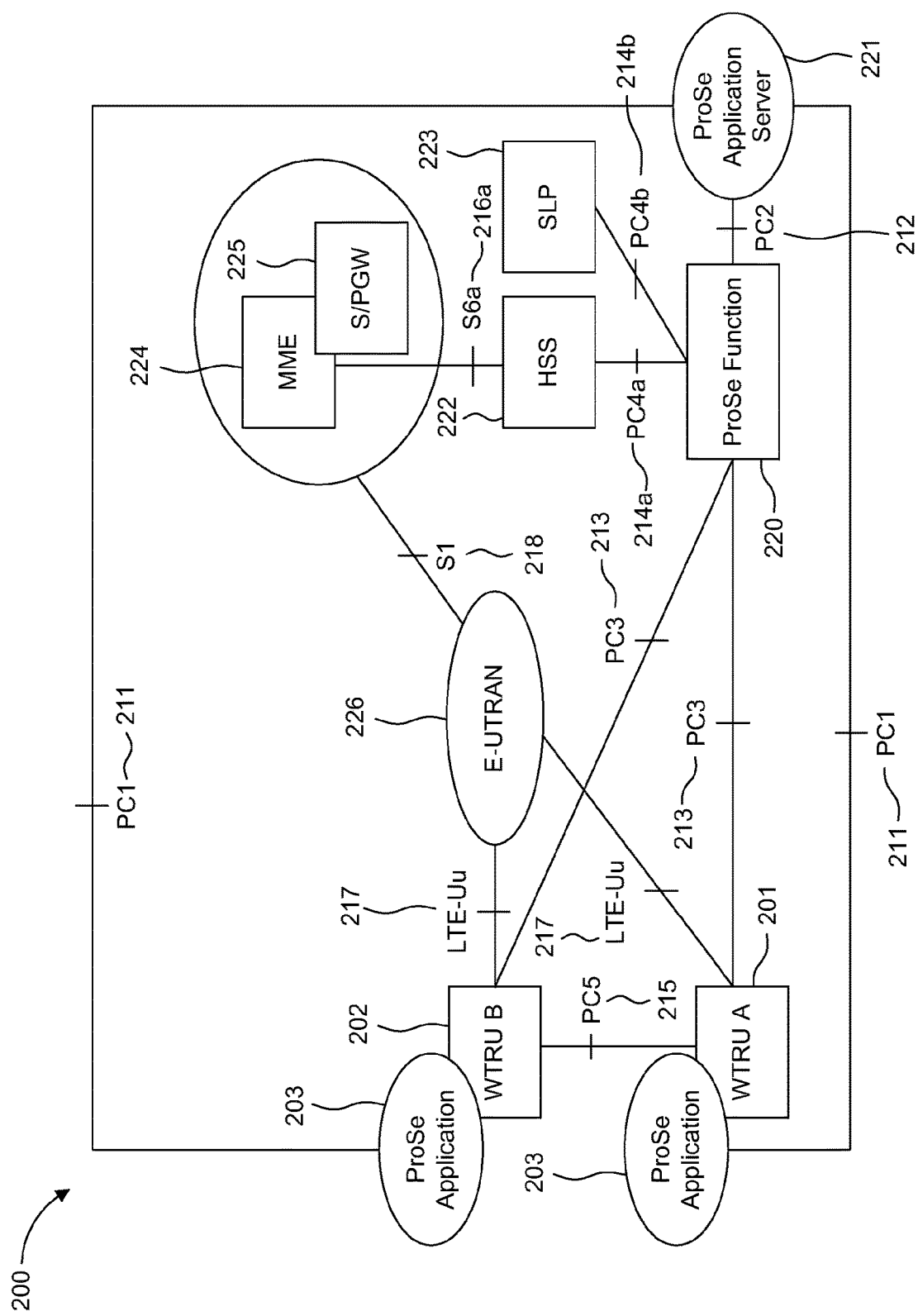
FIG. 2 is a diagram illustrating the basic architecture of 3GPP ProSe in EPC according to an embodiment.

FIG. 2 is a diagram illustrating the basic architecture of 3GPP ProSe 200 in EPC, according to an embodiment. In the embodiment illustrated in FIG. 2, the 3GPP Prose architecture comprises a first WTRU 201 with a ProSe application 203, a second WTRU 202 with a Prose application 203, The first WTRU 201 and the second WTRU 202 may be communicatively coupled to E-UTRAN 226 via an LTE-Uu interface 217. The first WTRU 201 may first contact the ProSe function 220 through the PC3 interface 213 to get authorization and security parameters. The Prose Function 220 may be communicatively coupled to a ProSe Application Server 221 via a PC2 interface 212. The ProSe Function 220 may be further communicatively coupled to a hone subscriber server (HSS) 222 via a PC4a interface 214a and a Secure User Plane Location (SUPL) Location Platform (SLP) 223 via a 214b interface. The HSS 222 may be communicatively coupled to a mobile management entity (MME) 224 and a Serving/PDN Gateway (S/PGW) 225 via a S6a interface 216a. The MME 224 and S/PGW 225 may be communicatively coupled to the E-UTRAN via a S1 interface 218. After the discovery request and response message exchange via the PC3 interface 213 is completed, the first WTRU 201 may begin the direct discovery process to find other WTRUs with ProSe capability in their proximity using a PC5 interface 215, such as the second WTRU 202 in the example illustrated in FIG. 2. When two or more ProSe-enabled WTRUs have discovered each other (e.g., first WTRU 201 and second WTRU 202), they may begin direct communication over the direct link between them.

The physical interface between two ProSe WTRUs may be referred to as a sidelink. Time-frequency resources for the sidelink may be shared with the UL, and the sidelink waveform may be similar to the single carrier frequency-divisional multiple access (SC-FDMA) UL waveform. The sidelink transmission may be based on multicasting with no hybrid automatic repeat request (HARQ) feedback. Instead, each MAC protocol data unit (PDU) may be retransmitted three times with a different redundancy version for each transmission. Dedicated resource pools are allocated for sidelink transmissions in order to avoid collisions between them and conventional UL transmissions. The subframes and physical resource blocks (PRBs) belonging to sidelink resource pools may be broadcasted as system information to WTRUs. Resources within a resource pool may be allocated by an evolved NodeB (eNB) (Mode 1) or they may be autonomously selected by a WTRU (Mode 2), which enables sidelink communication when a WTRU is not within the cell coverage.

ProSe communication may allow a WTRU to operate as a relay for another WTRU. The relaying may be implemented in such a way that the network cannot differentiate the traffic of the remote WTRU from that of the relay WTRU.

Service requirements related to the 5G system may consider D2D in two different ways. The first approach uses direct device communication without any network entity in the middle. In the second approach, a relay WTRU is between a WTRU and the 5G network. The second approach may be referred to as an indirect network connection mode.

Service continuity plays a key role when changing from one relay WTRU to another or to the direct network connection mode. In addition, the 5G system is expected to support the battery consumption optimization of relay WTRUs.

Another important area for D2D communications is a vehicular communications of V2X communications that may be divided into three areas, namely vehicle-to-vehicle (V2V), vehicle-to-infrastructure (V2I), and vehicle-to-network (V2N). The V2V and V2I communications towards the other vehicles and roadside units (RSU) are handled through the PC5 interface in 3GPP networks. Connectivity to the network and the cloud (V2N) goes through the Uu interface (i.e., air interface).

Figure 3:
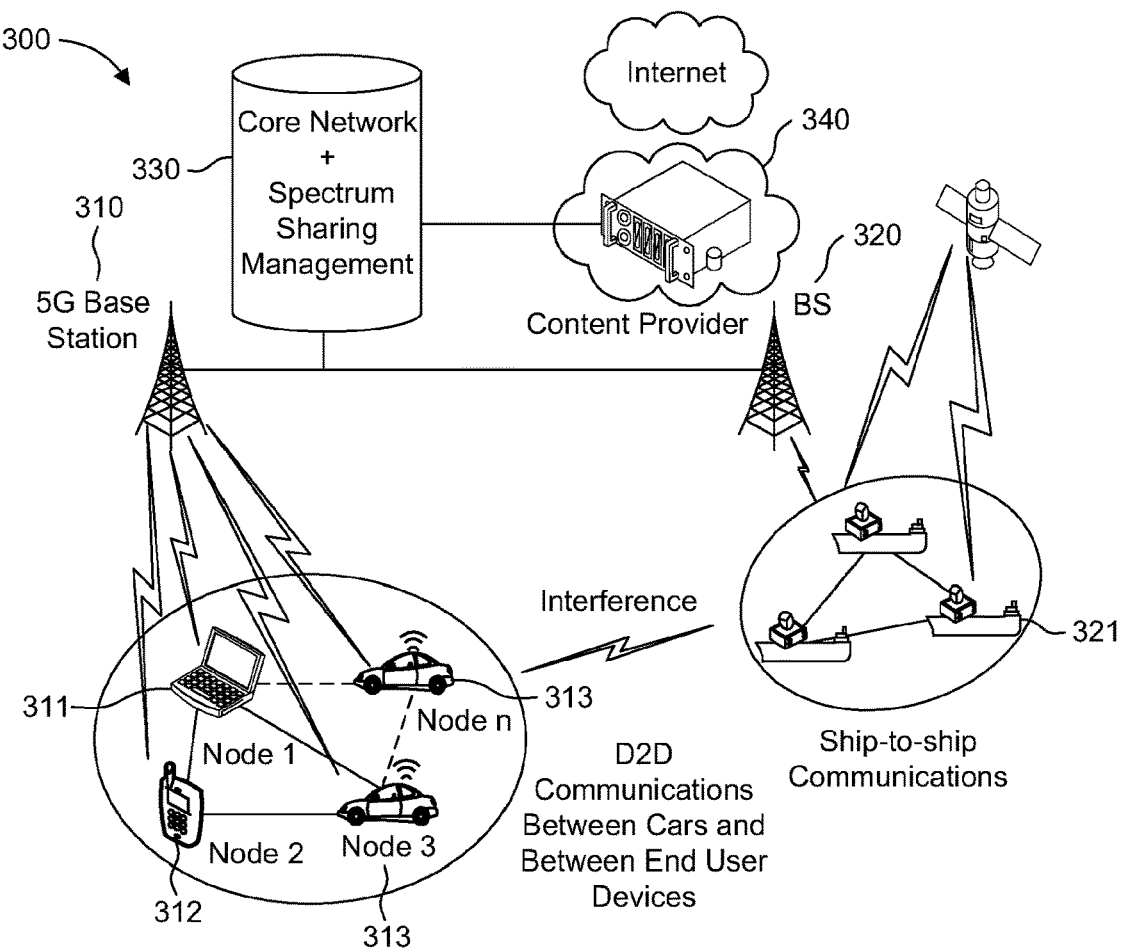
FIG. 3 is a ProSe System Model for 5G and beyond according to an embodiment.

FIG. 3 is a diagram illustrating D2D communications 300 for combined LTE-5G and WiFi, according to an embodiment. There are different types of users that are connected to base stations using cellular interfaces. For example, in the embodiment illustrated in FIG. 3, a laptop 311, a cellular telephone 312, and cars 313 are connected to a 5G base station 310. Also, in the embodiment illustrated in FIG. 3, ships 321 are connected to a base station 320. The base stations 310, 320 are connected to a content provider 340 via a core network and spectrum sharing management system 330. Nodes may also communicate directly using D2D communication links between nodes that are in proximity to each other. Direct links between user devices such as phones and laptops may use several RATs, including 3GPP evolution, Bluetooth, or WiFi standards. Cars may also use a dedicated standard for V2X communications. Autonomous and remote-controlled ships may use ship-to-ship communications and radios specifically developed for these purposes. Both in the V2X communications, among cars and in maritime communications, integrated 5G satellite-terrestrial systems will be needed.

The following information may be provisioned to the WTRU for one-to-many ProSe Direct Communication: (1) Authorization Policy, (2) ProSe Direct Communication Policy/Parameters, and (3) Radio Parameters for when the WTRU is "not served by the E-UTRAN".

For the Authorization Policy, when the WTRU is "served by the E-UTRAN", public land mobile network (PLMN) in which the WTRU is authorized to perform one-to-many ProSe Direct Communication are provisioned. When then WTRU is "not served by the E-UTRAN" (e.g., when the WTRU is not served by the E-UTRAN cell operating on the carrier frequency provisioned for ProSe Direct Communication), it may be indicated whether the WTRU is authorized to perform one-to-many ProSe Direct Communication procedures.

For ProSe Direct Communication Policy/Parameters, for each application layer group supported, the following parameters may enable the WTRU to perform one-to-many ProSe Direct Communication when provisioned from Direct Provisioning Function (DPF) in the ME or configured in the UICC: Application Layer Group ID, which identifies an application layer group that the WTRU belongs to; ProSe Layer-2 Group ID; and ProSe Group IP multicast address; an indication whether the WTRU should use IPV4 or IPv6 for that group; and for a specific group configured to operate using IPv4, optionally an IPV4 address to be used by the WTRU as a source address, and, if none is provisioned, then the WTRU may use Dynamic Configuration of IPV4 Link-Local Addresses to obtain a link local address for the Group. Group security related content for one-to-many ProSe Direct Communication may also be provided. These parameters may be provided from the third party public safety provider application server. If a WTRU receives a set of data with the same Application Layer Group IP from the Application Server that has been previously provided by the DPF, then the WTRU may use the data set provided by the Application Server for one-to-many ProSe Direct Communication.

For Radio Parameters when the WTRU is "not served by the E-UTRAN", radio parameters may be included with Geographical Area(s) that need to be configured in the WTRU in order to be able to perform one-to-many ProSe Direct Communication procedures when "not served by E-UTRAN". These radio parameters (e.g., frequency bands) may be used for all types of ProSe Direct Communication, such as one-to-one, one-to-many, or ProSe WTRU-to-Networking Relaying. The WTRU may use the Radio Parameters if the WTRU can locate itself in the corresponding Geographical Area. Otherwise, the WTRU may not be authorized to transmit.

Figure 4:
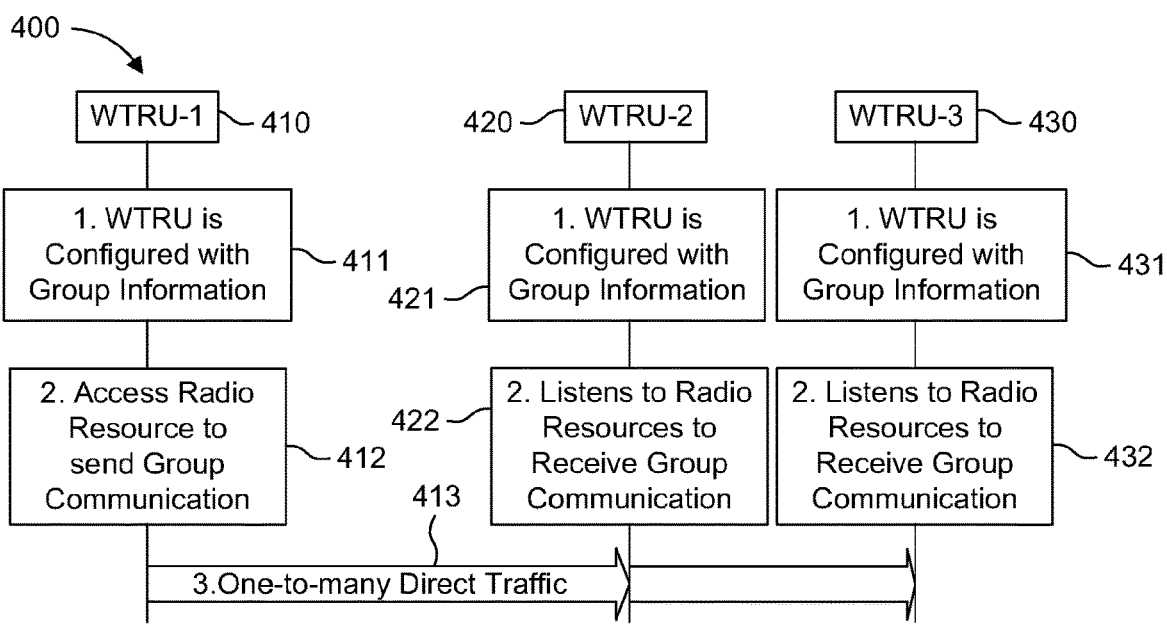
FIG. 4 is a diagram illustrating a one-to-many ProSe Direct Communication transmission procedure according to an embodiment.

FIG. 4 is a diagram 400 illustrating a one-to-many ProSe Direct Communication transmission procedure, according to an embodiment. This procedure may be applicable to authorized ProSe-enabled Public Safety WTRUs.

At 411 a first WTRU 410 may be configured with the related information for one-to-many ProSe Direct Communication. The WTRU may obtain the necessary group context (e.g., ProSe Layer-2 Group IP, ProSe Group IP multicast address) to transmit IP-layer transport of data, and the radio resource related parameters used for the Direct Communication.

At 412, the first WTRU 410 finds the appropriate radio resource to conduct one-to-many ProSe Direct Communication 413. The PDU that passed for transmission to the Access Stratum may be associated with a Layer-3 protocol data unit type. The protocol data unit may also be associated with the corresponding Source Layer-2 ID and Destination Layer-2 ID. The Source Layer-2 ID is set to the ProSe WTRU ID assigned from the ProSe Key Management Function. The Destination Layer-2 ID may be set to the ProSe Layer-2 Group ID. The PDU may also be associated with the ProSe Per-Packet Priority associated with the PDU.

The first WTRU 410 may send the IP data to the IP multicast addressing using the ProSe Layer-2 Group ID as Destination Layer-2 ID.

A second WTRU 420 and a third WTRU 430 may be configured with the group information at 421 and 431, respectively. The first WTRU 420 and third WTRU 430 may listen to radio resources to receive group communication at 422 and 432, respectively and receive one-to-many direct traffic 413.

Figure 5:
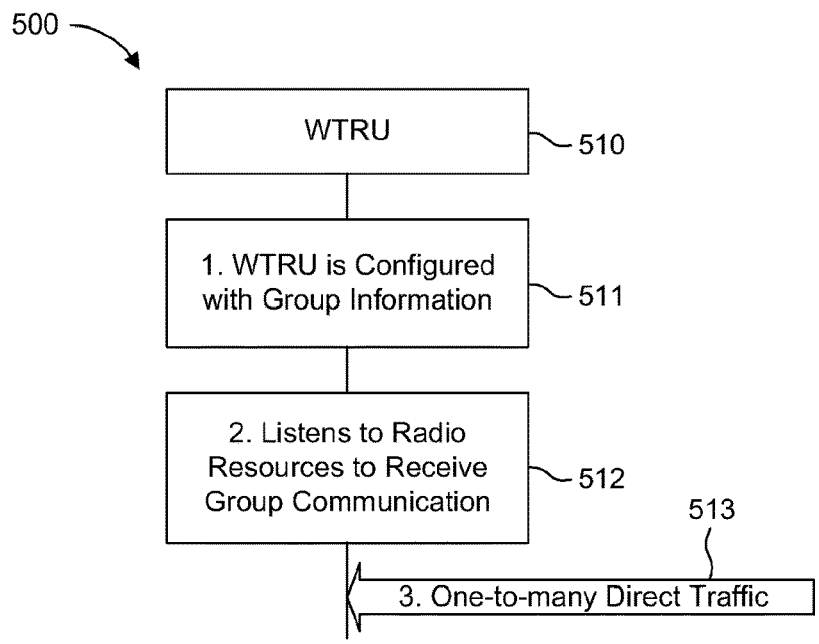
FIG. 5 is a diagram illustrating a one-to-many direct communication reception procedure according to an embodiment.

FIG. 5 is a diagram 500 illustrating a one-to-many direct communication reception procedure according to an embodiment. This procedure is may be applicable to authorized ProSe-enabled Public Safety WTRUs. At 511, a WTRU 510 may be configured with the related information for one-to-many ProSe Direct Communication. The WTRU may obtain the necessary group context (ProSe Layer-2 Group ID, Group IP multicast address) to receive IP-layer transport of data, and the radio resource related parameters used for the Direct Communication.

The WTRU 510 may listen to the allocated radio resource to receive one-to-many ProSe Direct Communication at 512 and receive one-to many direct traffic 513.

The WTRU 510 may filter out the received frames based on the ProSe Layer-2 Group ID contained in the Destination Layer-2 ID and if it matches one of the configured group IDs, it may deliver the enclosed pack to the upper layers. The IP stack may filter the received packets based on the Group IP multicast address. The protocol data unit passed to the upper layer may be associated with a Layer-3 protocol data unit type. The EPC network may decide to enable two or more ProSe-enabled WLAN-capable WTRUs to direct communication using WLAN technology. In some embodiments, this decision may be made when the EPC network supports EPC-level ProSe discovery and becomes aware that two or more WTRUs are in close proximity, when the EPC network knows that a first WTRU requests to communicate with a second WTRU which is in close proximity of the first WTRU, etc.

Figure 6:
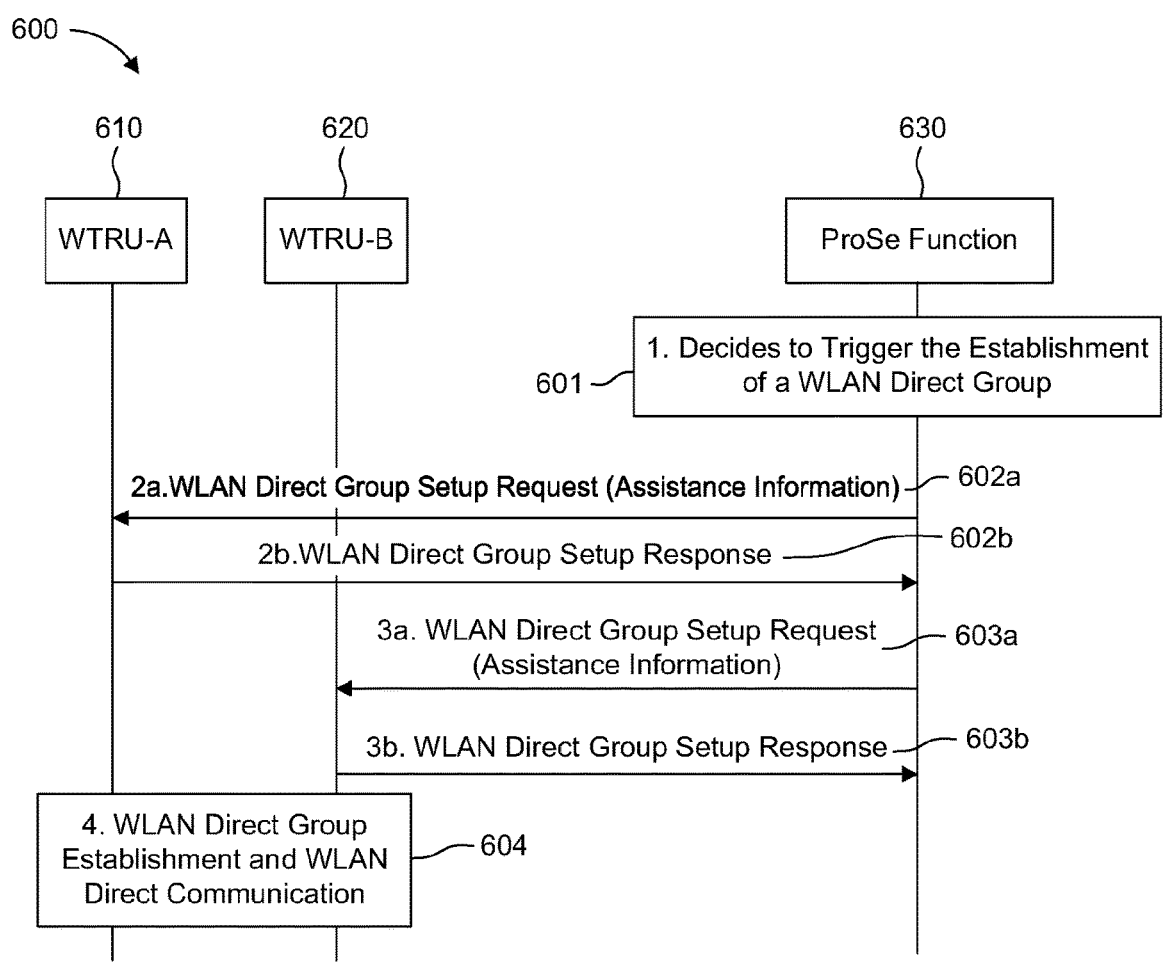
FIG. 6 is a diagram illustrating a signaling flow for EPC support for WLAN direct communication according to an embodiment.

FIG. 6 is a 600 illustrating a signaling flow for EPC support for WLAN direct communication 600 according to an embodiment. FIG. 6 shows how the EPC network enables a first WTRU 610 and a second WTRU 620 to directly communicate in WLAN direct mode. This may be accomplished by triggering the two WTRUs 610, 620 to establish a WLAN direct group and providing them with assistance information which enables the EPC network to control and to expedite the establishment of the WLAN direct group.

With the procedure shown in FIG. 6, the EPC network may control when a WLAN direct group can be established, authorize the WTRUs that can become members of this group (and thus communicate with each other in WLAN direct mode), and control the operating parameters of the WLAN direct group (e.g., the SSID, the security keys, etc.).

In the procedure shown in FIG. 6, the EPC network may authorize and trigger the establishment of WLAN direct groups.

The ProSe Function 630 is the network function that triggers and controls the establishment of a WLAN direct group between one or more WTRUs.

In FIG. 6, at 601, the ProSe Function 630 may trigger the first WTRU 610 and the second WTRU 620 to establish a WLAN direct group under the control of the network.

At 602a, the ProSe Function 630 may send a WLAN Direct Group Setup Request (Assistance Information) to the first WTRU 610. The Assistance Information may comprise a set of parameters which may expedite the establishment of the WLAN direct group and enable the EPC network to control the operating parameters of the WLAN direct group. The Assistance Information content may depend on the WLAN technology. If the first WTRU 610 accepts the request and the offered Assistance Information, the first WTRU 610 may respond with a WLAN Direct Group Setup Response at 602b. This Response may include parameters for the WLAN direct group proposed by the first WTRU 610 (e.g., an operating channel). When EPC support for WLAN direct discovery and communication is used in conjunction with EPC-level discovery, the assistance information for WLAN direct discovery and communication may be provided as part of the Proximity Alert procedure.

At 603a, the ProSe Function 630 may also send a WLAN Direct Group Setup Request (Assistance Information) to the second WTRU 620. The Assistance Information in the Request at 603b may consider the parameters proposed by the first WTRU 610 in the WLAN Direct Group Setup Response at 602b.

At 604, the first and second WTRUs 610, 620 may establish a WLAN direct group and may begin communicating in WLAN direct mode. The first WTRU 610 and the second WTRU 620 may be controlled by the same ProSe Function 630.

E-UTRAN attach for a ProSe-enabled WTRU may be performed. The Pro-Se-enabled WTRU may include the ProSe capability indication as part of the "UE Network Capability" in the Attach Request message. MME stores this information for ProSe operation. ProSe capability may indicate whether the WTRU is capable of supporting one or more of the following ProSe direct services: ProSe Direct Discovery, ProSe Direct Communication, and ProSe WTRU-to-Network Relay.

If the MME is configured to indicate "ProSe authorized" to E-UTRAN, the WTRU is ProSe-enabled, and the WTRU is authorized to use ProSe direct services based on the subscription data, the MME may include a "ProSe authorized" indication in the S1 AP Initial Context Setup Request, indicating which of the ProSe direct services the WTRU is authorized to use. If the WTRU's "ProSe authorized" status indicates the WTRU is not authorized to act as a WTRU-to-Network Relay, then the eNodeB may not authorize the WTRU to use radio resources for Relay.

For unicast uplink traffic, the ProSe WTRU-to-Network Relay may use the uplink TFTs to select the uplink EPS bearers for relayed uplink packets independently from the ProSe Per Packet Priority applied over PC5 by Remote WTRUs.

For unicast downlink traffic, the ProSe WTRU-to-Network Relay may map the QCI of the EPS bearer into a ProSe-Per-Packet Priority value to be applied for the downlink relayed unicast packets over PC5. The mapping rules are provisioned in the Relay WTRU.

EPS bearers associated with the same QCI, but different ARP values may result in the same ProSe Per-Packet Priority over PC5.

For eMBMS traffic, the ProSe WTRU-to-Network Relay may use the ProSe Per-Packet Priority that is requested for a specific TMGI by Remote WTRUs using PC5-S procedures to be applied for the multicast packets corresponding to that TMGI when they are relayed over PC5.

The Remote WTRU may receive the QCI associated with the TMGI at the application layer along with an associated priority value that the application layer in the Remote WTRU maps into a ProSe Per-Packet Priority.

Figure 7:
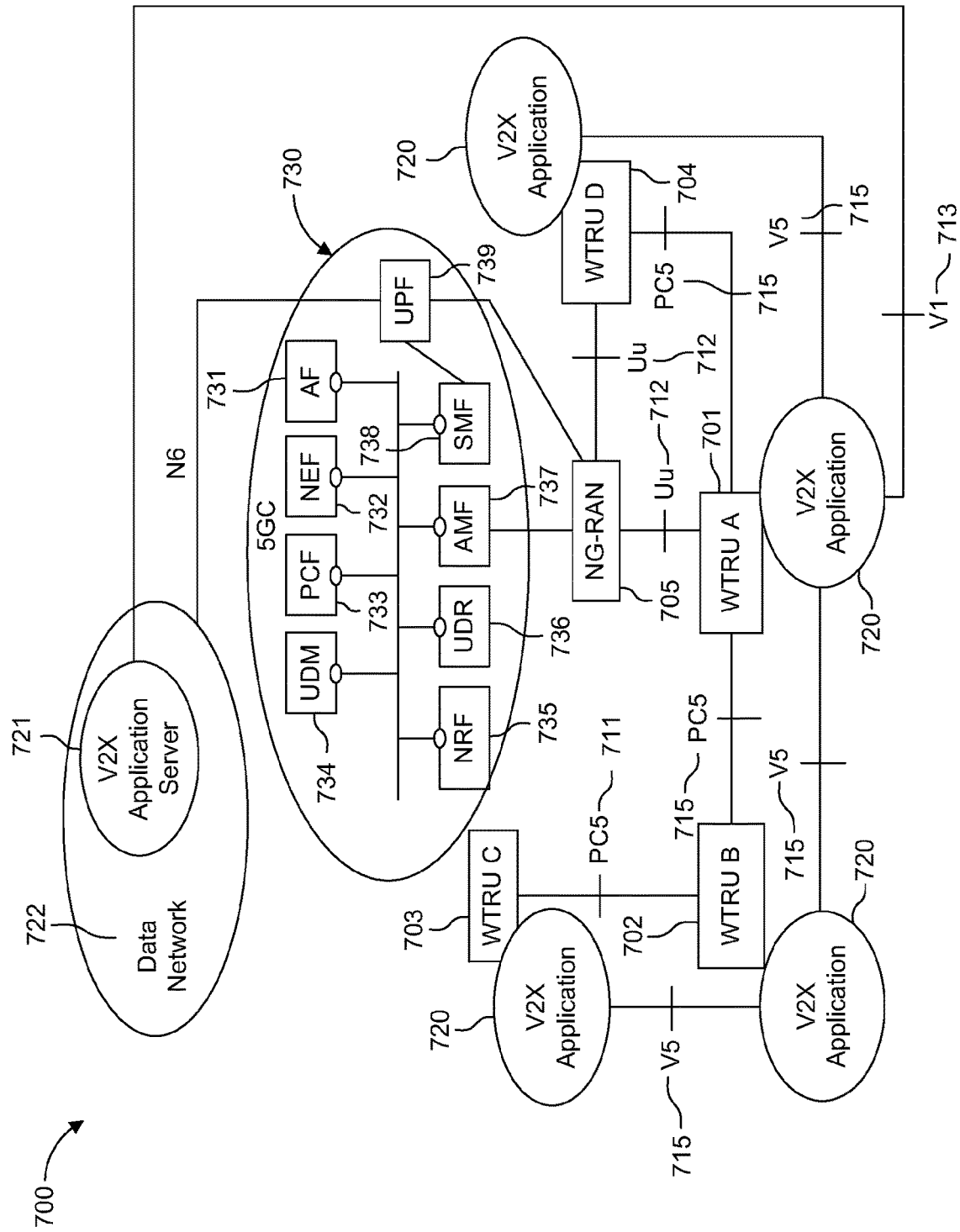
FIG. 7 is a diagram illustrating non-roaming 5G system architecture for V2X communication over PC5 and Uu reference points according to an embodiment.

FIG. 7 is a diagram illustrating non-roaming 5G system architecture 700 for V2X communication over PC5 715 and Uu reference points 712, according to an embodiment. The system architecture illustrated in FIG. 7 may be the reference architecture for 5G ProSe, which includes applications such as V2X, D2D, etc. For example, in the embodiment illustrated in FIG. 7, a first WTRU 701, second WTRU 702, a third WTRU 703, and a fourth WTRU 704 each have a V2X Application 720. Direction communication between the first WTRU 701, the second WTRU 702, the third WTRU 703, and the fourth WTRU 704 may be established via a PC5 interface 715. The 5G CN 730 may comprise an AF 731, Network Exposure Function (NEF) 732, policy control function (PCF) 733, Unified Data Management (UDM) 734, Network Repository Function (NRF) 735, Unified Data Repository (UDR) 736, AMF 737, Session Management Function (SMF) 738, and User Plane Function (UPF) 739. The V2X Application Server 721 in a data network 7228 is equivalent to 5G Application function (AF) or Prose Application Server in 4G. The 5G AF may use proximity services in the same way as the V2X Application Server.

In the embodiment illustrated in FIG. 7, the PC5 interface 715 may be NR based. Further, the architecture may not include a PC3 interface and instead use a V1 interface 713 and a V5 interface 715 for IP level user plan communication, such as HTTP request/response. The ProSe Function may be assumed to be part of the PCF 733 and UDR 736. The ProSe Application Server may be a 5G AF.

Figure 8:
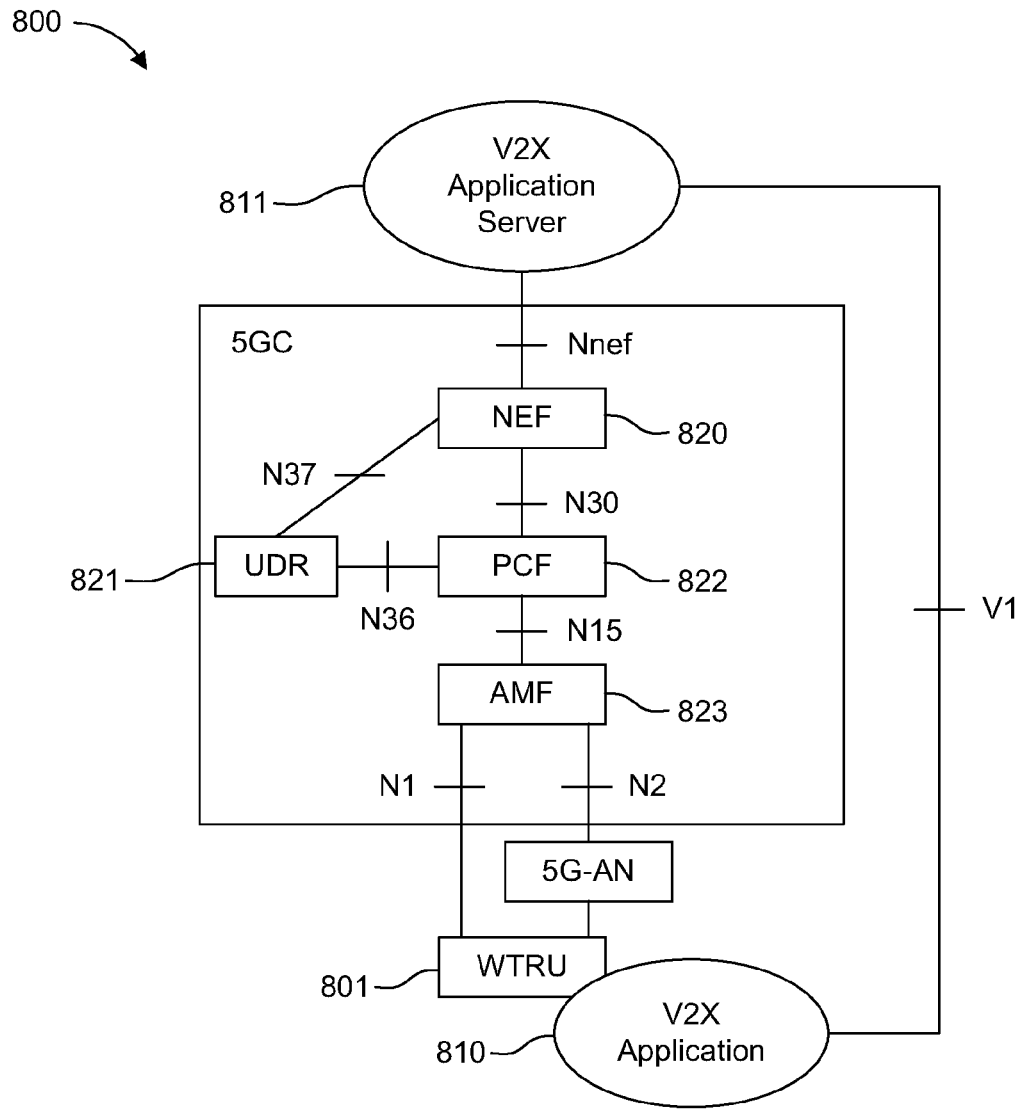
FIG. 8 is a diagram illustrating a system architecture for Application Function (AF) based server parameter provisioning for V2X communications according to an embodiment.

FIG. 8 is a diagram illustrating a system architecture 800 for AF-based server parameter provisioning for V2X communications, according to an embodiment. In the embodiment illustrated in FIG. 8, the V2X Application Server 811 is the 5G AF. The V2X Application Server 811 may provide provisioning and configuration information related to proximity services to NEF 820, which stores the information in the Unified Data Repository (UDR) 821. Any 5G AF may use the same interfaces and procedures to provide proximity services.

If a WTRU 801 comprising a V2X application 810 indicates Proximity Services (e.g., V2X, D2D) capability in the "Registration Request" message and if the WTRU 801 is authorized to use proximity serve based on subscription data, the AMF 823 may select the PCF 822, which supports Proximity Services Policy/Parameter provisioning and establishes a WTRU policy association with the PCF for Policy/Parameter delivery. The PCF 822 may be designated/pre-assigned to handle Proximity Services.

Based on the indication from the WTRU 801 and/or WTRU subscription data during the Registration procedure, the AMF 823 may include the Proximity Service (e.g., V2X, D2D) capability indication in the "Nnrf_NFDiscovery_Request" message as the optional input parameter. If provided, the NRF may take the information into account for discovering the PCF instance.

In future home immersive gaming, it is anticipated that a plurality of wireless devices and sensors will be used by players. Some devices may have dual connectivity capability, such as 3GPP (i.e., 5G) and non-3GPP. However, other devices may have only one supported connectivity, such as 3GPP only or non-3GPP only. In a gaming use case, it is anticipated that these devices and sensors will interact to make the gaming experience more immersive, responsive, and lifelike. D2D technology may be utilized in these scenarios where devices and sensors directly communicate among themselves.

D2D technology may be utilized by 5G devices in the home to interact with other devices. D2D technology supports both unicast and multicast mode of communication. Other non-3GPP devices may interact among themselves using WiFi Direct. The 5G system (5GS) can manage the D2D communication using WiFi Direct. The 5GS supports creating a D2D system among IEEE 802 devices using WiFi Direct and providing configuration information to a 5G device capable of connecting over both technologies.

Figure 9:
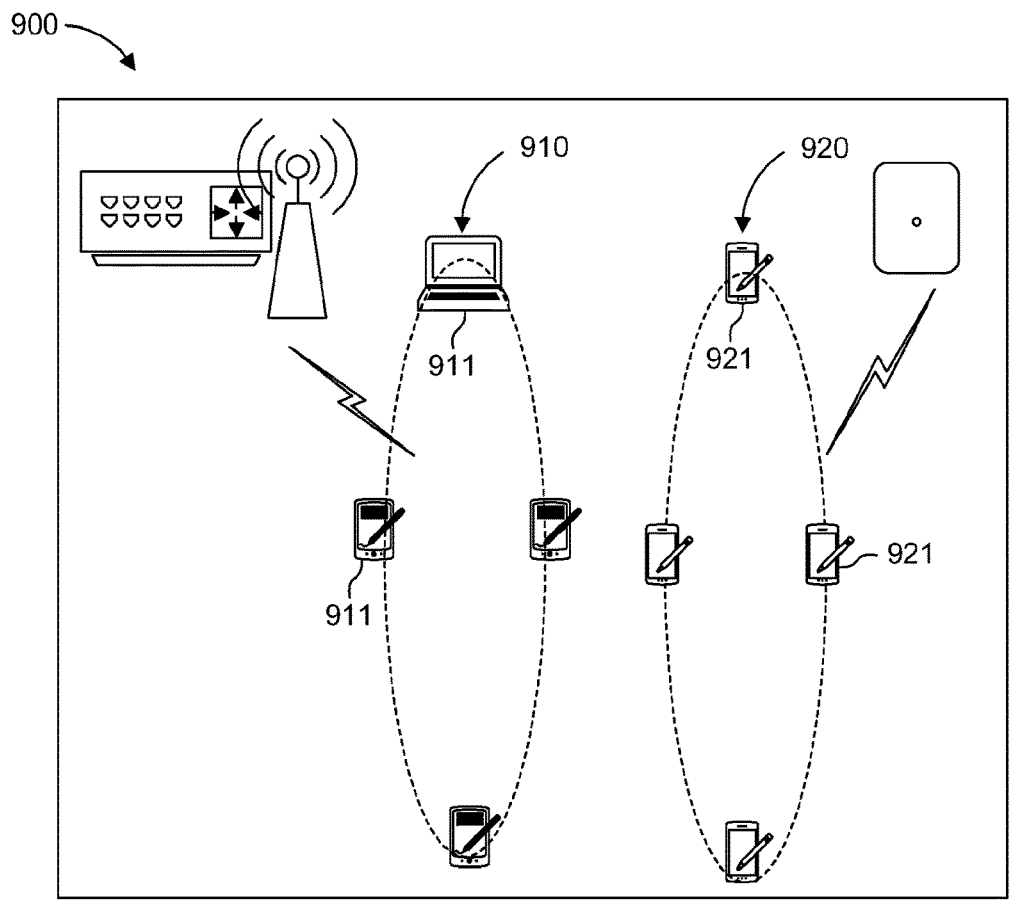
FIG. 9 is a diagram illustrating separate D2D groups.

FIG. 9 is a diagram 900 illustrating separate D2D groups 910, 920. Group 910 includes gaming devices 911 that are non-3GPP only and group 920 includes gaming devices 921 that are 3GPP only. If it is not possible to setup a D2D unicast or D2D multicast communication mechanism among all the devices 911 and 921, it may only be possible to setup D2D communication either among 3GPP devices 921 in group 920 only or among non-3GPP devices 911 in group 910 only.

Figure 10:
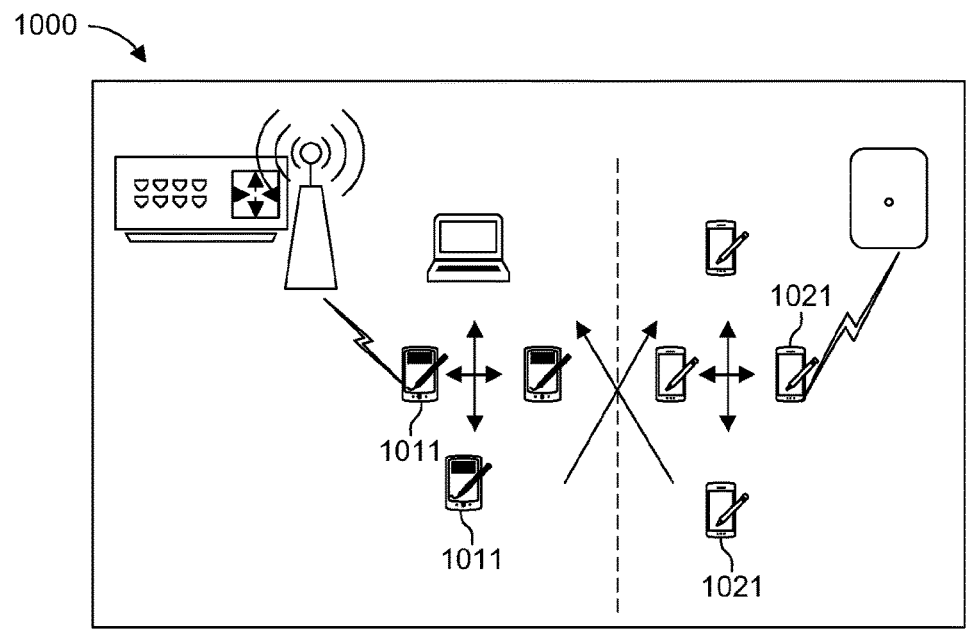
FIG. 10 is a diagram illustrating D2D across different technologies according to an embodiment.

FIG. 10 is a diagram illustrating D2D communication 1000 across different technologies, according to an embodiment. Non-3GPP devices 1011 and 3GPP devices 1021 may communicate via a cloud-based rendezvous point. For some applications, latency may be too high and privacy may be a concern. Non-3GPP devices and 3GPP devices may also communicate via a local rendezvous point (e.g., a bridge node in the home), but they need to be configured manually and do not provide standard APIs to facilitate integration. Methods to facilitate interworking of 3GPP 4G and 5G devices with non-3GPP devices to enable inter-RAT low latency local communication are desirable.

The problem addressed herein is how to set up a D2D communication between two devices of different technology (e.g., 3GPP and non-3GPP) and among multiple devices of different technology (e.g., 3GPP and non-3GPP). The solution should have minimal impact on 5G system and procedure, provide some level of performance and reliability, similar configuration and management as 3GPP 5G, and same solution which can work for both 1-1 and 1-N communication.

Figure 11:
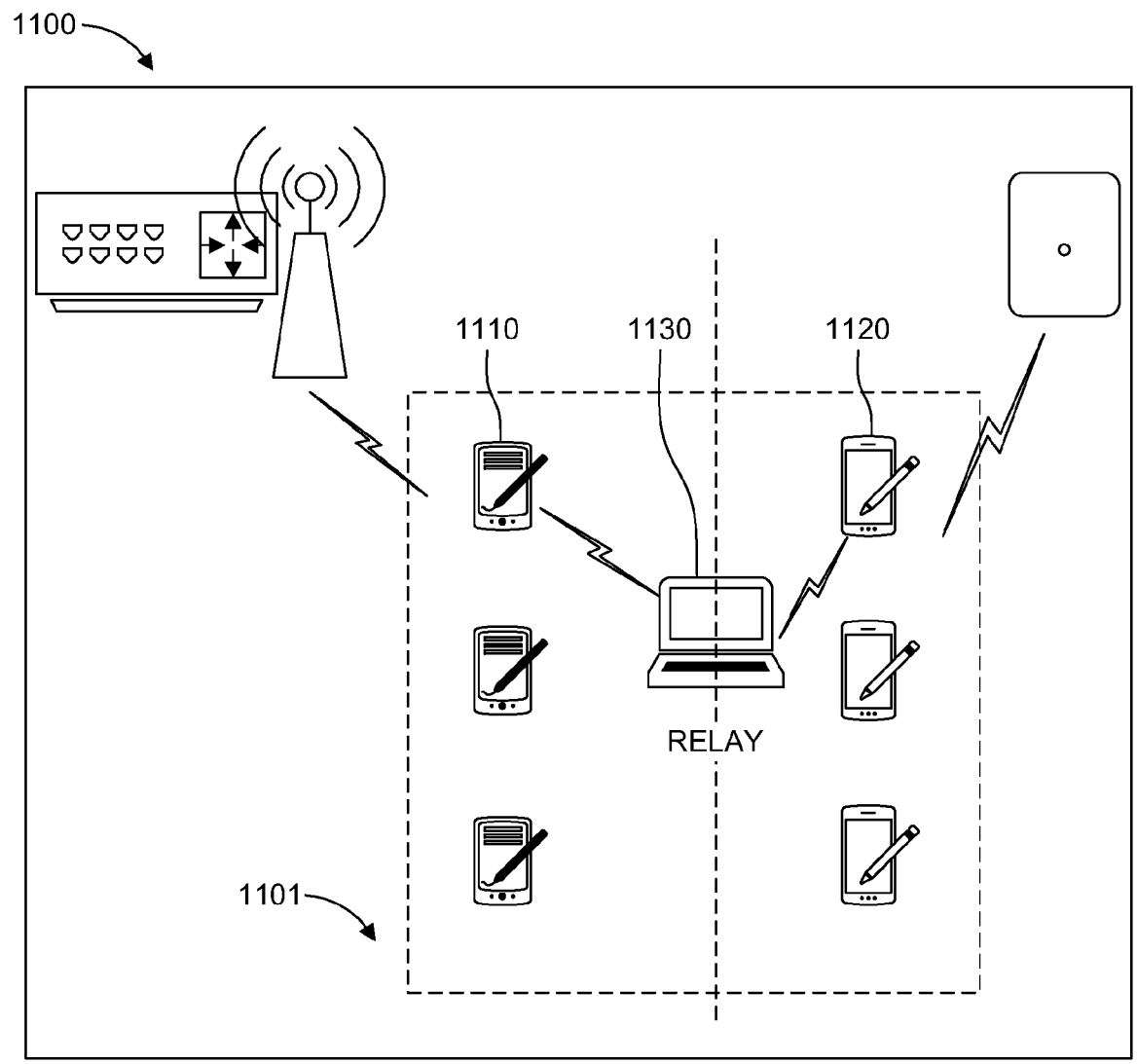
FIG. 11 is a diagram illustrating a Group for Enhanced D2D (eD2D) according to an embodiment.

FIG. 11 is a diagram 1100 illustrating a group for enhanced D2D (ED2D) 1101, according to an embodiment. For "one-to-one" or "one-to-many" direct communication among 3GPP devices 1120 and non-3GPP devices 1110, a group 1101 including 3GPP 1.120, non-3GPP 1.110, and a special function called relay for enhanced D2D (RED2D) 1130 is created in the 5G Prose Application Server. In some embodiments, an Application Function (AF) requests that the ProSe Application Server create the group. At a minimum, this group may be comprised of a 5G device 1120, a non-3GPP device 1110 and a relay 1130.

Figure 12:
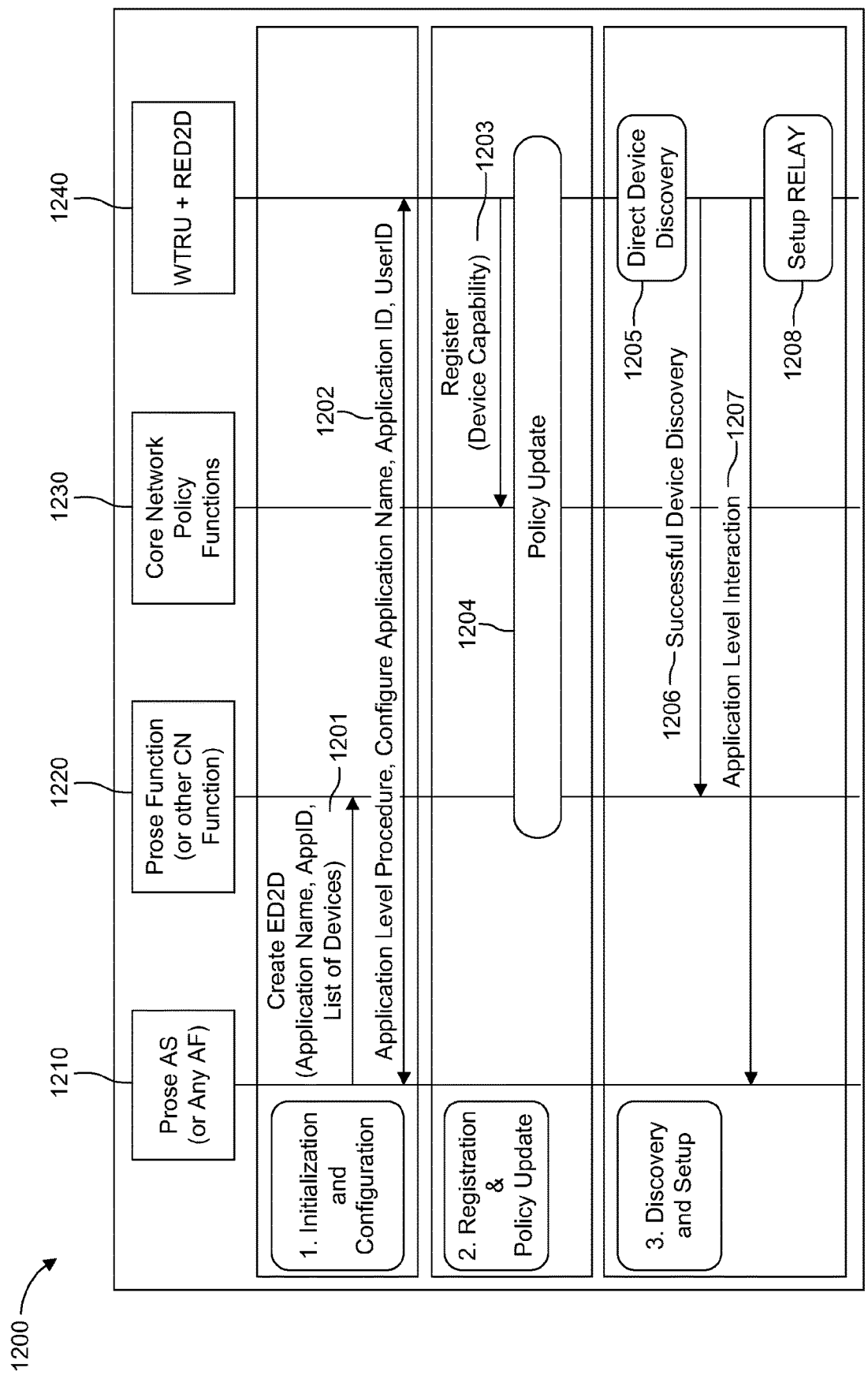
FIG. 12 is a diagram illustrating the process to enable, configure, and operate multiple radio access technology (multi-RAT) enhanced D2D (ED2D) communication across access technologies (e.g., 3GPP and non-3GPP) at a high-level according to an embodiment.

FIG. 12 is a diagram illustrating a process 1200 to enable, configure, and operate multi-RAT enhanced D2D (ED2D) communication across access technologies (e.g., 3GPP and non-3GPP), according to an embodiment. The procedure illustrated in FIG. 12 includes the interactions and messaging between the ProSe Application Server (or any AF) 1210, ProSe Function (or other CN function) 1220, CN Policy Functions 1230, and the 5G WTRU with the RED2D functionality (the RED2D) 1240.

At 1201, the ProSe Application Server 1210 may select a 3GPP device with non-3GPP capability (e.g., IEEE 802 capability), as relay for ED2D service referred to as the RED2D device 1240. At 1202, the ProSe Application Server 1210 provides ED2D application details to the CN, such as the ProSe Function 1220. The application details may include, but are not limited to, the Application Name, Application ID, and list of devices. The ProSe Function may update the policy database.

At 1203, devices may register and inform about their ED2D capability. The ProSe Function 1220 may configure the RED2D device 1240 with group related information such as Group ID and list of devices, which include 3GPP and non-3GPP devices. At 1204, policy details may be provided to all the devices which are part of the ED2D application. Policy details may include information for device discovery and which devices can be discovered. For the RED2D device 1240, a list of non-3GPP devices are also provided.

At 1205, direct device discovery may be performed. After successful device discovery at 1206, the RED2D device 1240 may inform the ProSe Application Server 1210 of the successful device discovery using Application Level Interaction at 1207. At 1208, the RED2D device 1240 may set up WiFi Direct group and configured relay layer to start ED2D communication. The RED2D device 1240 may start setting up a WLAN direct communication group with non-3GPP devices. The RED2D device 1240 may be configured to relay 5G communication to the non-3GPP stack for WLAN direct communication. It may also configured to relay in the other direction, where WLAN direct communications are relayed towards the 5G devices. The RED2D device 1240 may initialize and configure any security function.

After a successful setup of WLAN direct communication group and configuration of relay mode, D2D communication across multi-RAT devices may be enabled.

Figure 13:
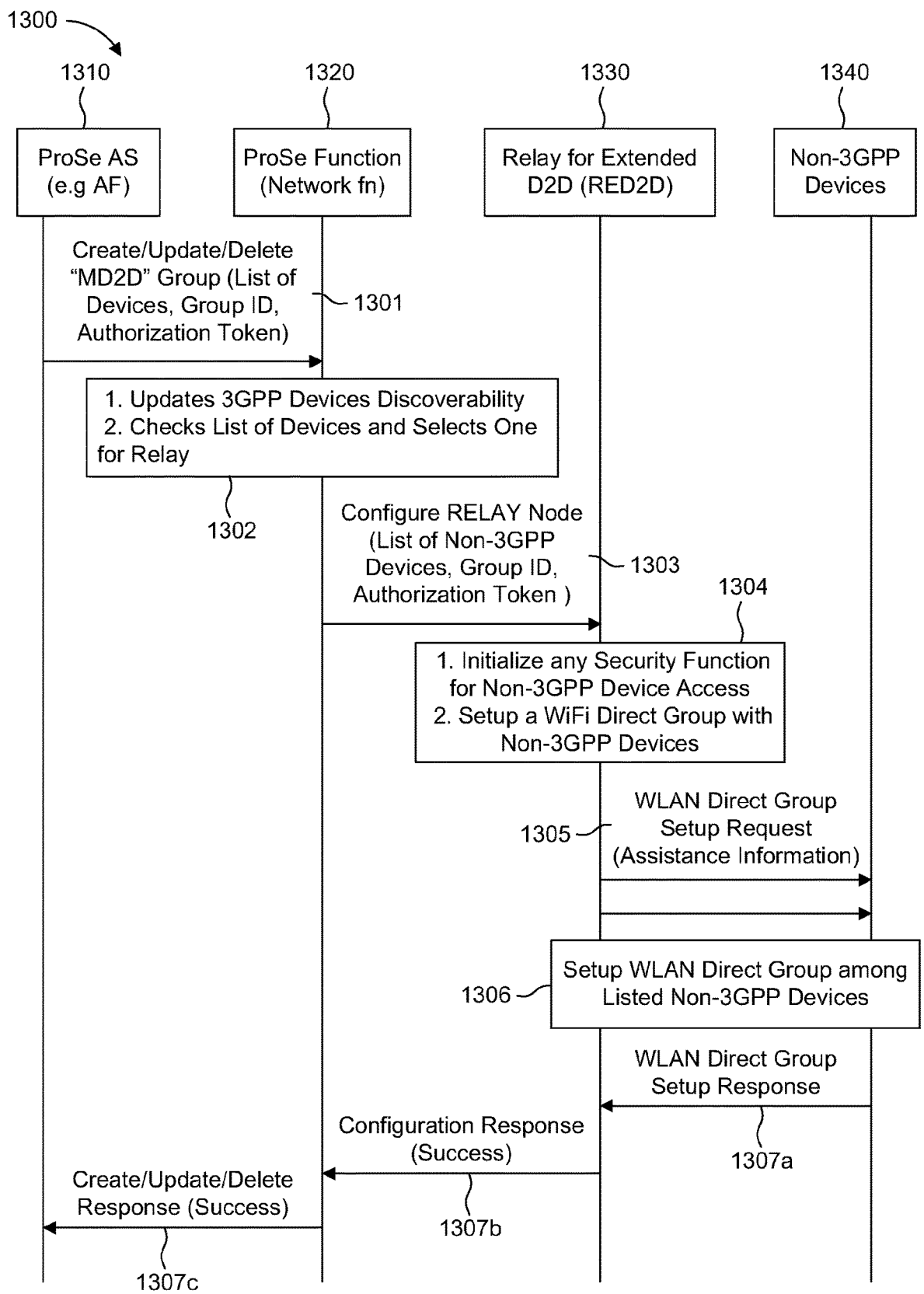
FIG. 13 is a diagram illustrating a procedure for setting up a multi-RAT D2D according to an embodiment.

FIG. 13 is a diagram illustrating a procedure 1300 for setting up D2D communication using multi-RAT, according to an embodiment.

At 1301, the ProSe Application Server 1310, or any AF, may create, update, and/or delete MD2D group. The ProSe Application Server 1310 may provide group information including, but not limited to, a list of devices, GroupID, and authorization token to the ProSe Function 1320. At 1302, the ProSe Function 1320 may update the 3GPP devices discoverability and check the list of the devices and selects a device to be used as the relay (RED2D) 1330. At 1303, the ProSe Function 1320 may configure the relay node by sending the RED2D 1330 the list of non-3GPP devices, the group ID, and authorization token. At 1304, the RED2D 1330 may initialize any security function for non-3GPP device access. The RED2D 1330 may setup a WiFi direct group with non-3GPP devices. At 1305, the RED2D 1330 may send a WLAN Direct Group Setup Request (Assistance Information) to the non-3GPP devices 1340. At 1306, the non-3GPP devices 1340 may setup WLAN Direct Group among listed non-3GPP devices. At 1307a, the non-3GPP devices 1304 may send a WLAN Direct Group Setup Response to the RED2D 1330. At 1307b, the RED2D 1330 may send a Configuration Response (Success) to the ProSe Function 1320. The ProSe Function 1320 may then send a Create/Update/Delete Response (Success) to the ProSe Application Server 1310 at 1307c.

The ProSe Function may be a logical function that is used for network related actions required for ProSe. The ProSe Function may play different roles for each of the features of ProSe. One such function is the support of Proximity Services.

Relevant capabilities, of the ProSe Application Server include, but are not limited to: storage of EPC ProSe User IDs (ProSe Function IDs, ProSe Discovery WTRU ID, and metadata), mapping of Application Layer User IDs and EPC ProSe User IDs, and mapping of RPAUID and PDUID for restricted ProSe Direct Discovery.

Figure 14:
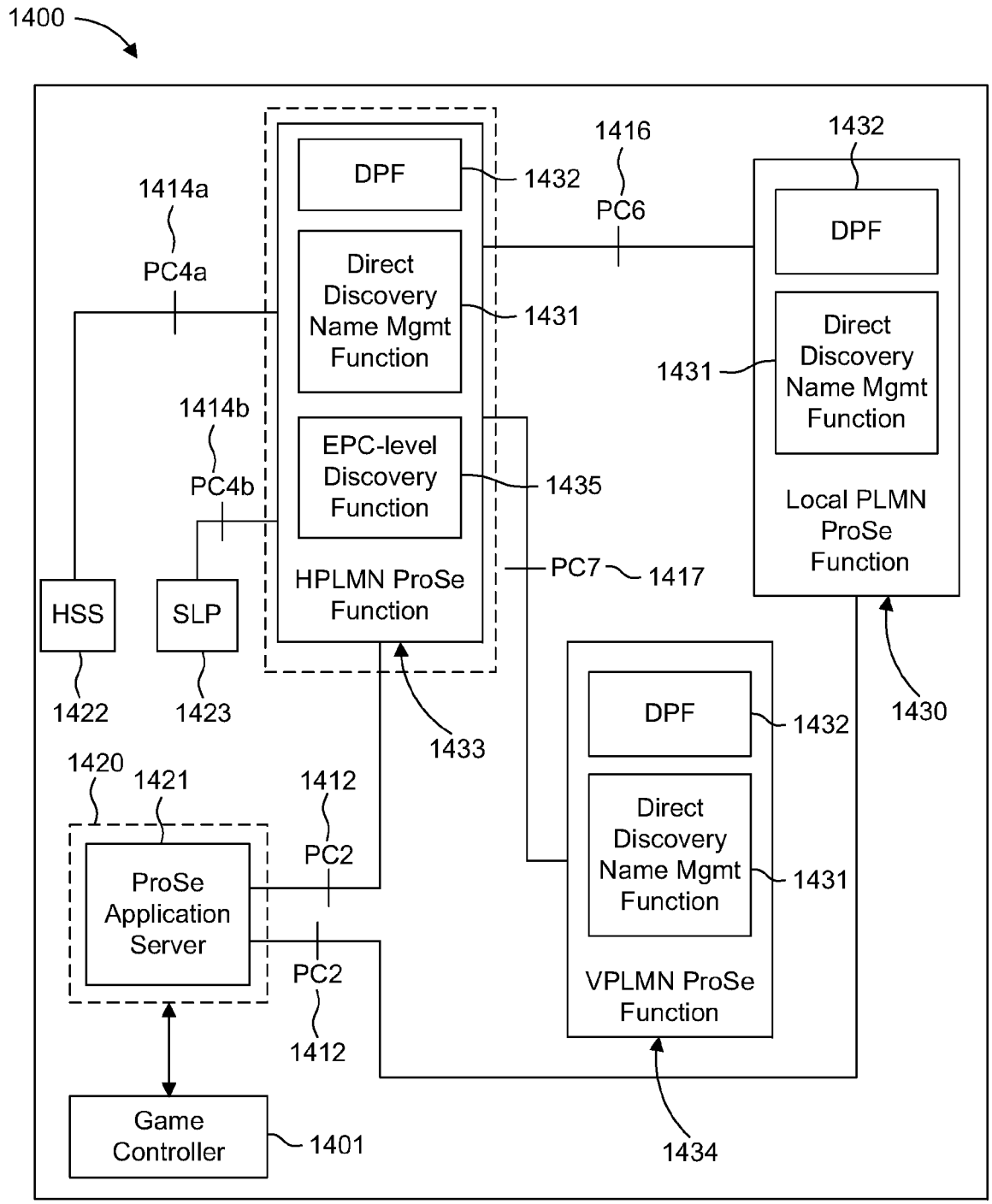
FIG. 14 is a diagram illustrating a ProSe Function interfaces to other network elements and public land mobile networks (PLMNs) according to an embodiment.

FIG. 14 is a diagram illustrating a ProSe Function interfaces 1400 to other network elements and PLMNs according to an embodiment. As shown in FIG. 14, the PC2 interface 1412 may be used between ProSe Function and ProSe Application Servers. A PC2 interface 1412 may be used to setup D2D communication using multi-RAT. A ProSe Application Server 1421 may be communicatively coupled to a Local PLMN Prose Function 1430. The Local PLMN ProSe Function 1430 may comprise a Direct Discovery Name Management Function 1431 and a DPF 1432. The ProSe Application Server 1421 may also be communicatively coupled to a HPLMN ProSe Function 1433 comprising a Direct Discovery Name Management Function 1431, DPF 1432, and EPC-level Discovery Function 1435. The HPLMN ProSe Function 1433 may be communicatively coupled to a VPLMN Prose Function 1434 comprising a Direct Discovery Name Management Function 1431 and DPF 1432 via a PC7 interface 1417. The HPLMN ProSe Function 1433 may also be communicatively coupled to the local PLMN ProSe Function 1430 via PC6 interface 1416. The HPLMN ProSe Function 1433 may also be communicatively coupled to an HSS 1422 via a PC4a interface 1414a and SLP 1423 via a PC4b interface 1414b.

A game controller 1401 inside a home may interact with a ProSe Application Server 1421 to provide configuration and game setup information. In some embodiments, the ProSe Application Server 1421 may reside in a Home Gateway 1420. In other embodiments, the Application Server 1421 may reside in a Mobile Edge Computing (MEC)/Edge Computing platform or CPE (Customer Premise Equipment).

The Game Controller Application Function may provide ProSe Application Server with a list of 3GPP devices and non-3GPP devices which are willing to interact directly or form a multicast group using D2D, using "Create ED2D group". In this list of devices, there may be one device with dual capability, named "Relay for ED2D". The Home Gateway or CPE may also act as the Relay for ED2D. This group of devices is called "Enhanced D2D Group". The ProSe Application server 1421 may validate the composition of the group. If one device with dual capability (Relay for ED2D) is not provided, the ProSe Application Server 1421 may reject the request.

Figure 15:
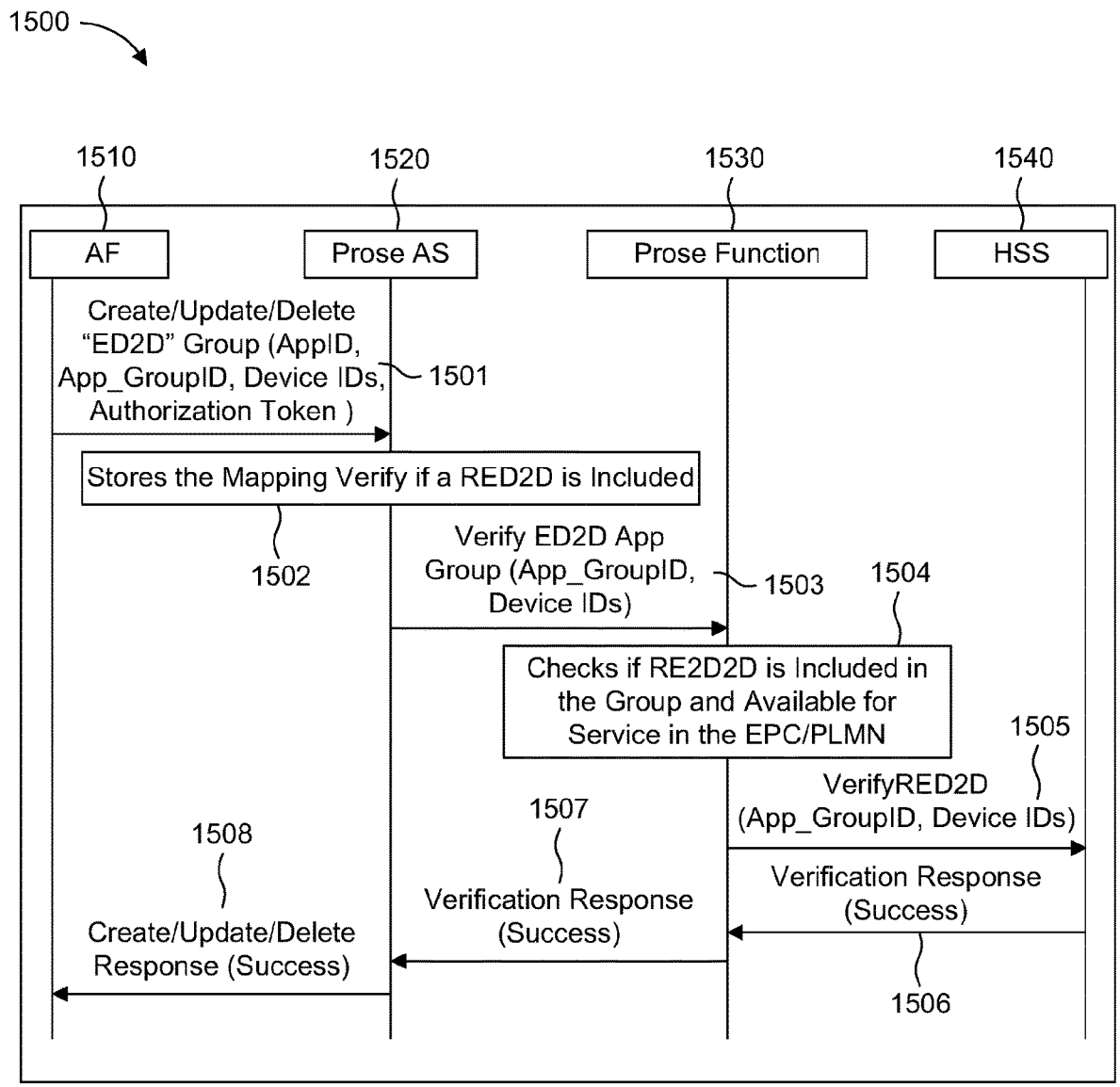
FIG. 15 is a diagram illustrating a procedure to create the ED2D group according to an embodiment.

FIG. 15 is a diagram illustrating a procedure 1500 to create the ED2D group according to an embodiment. At 1501, a Game Controller AF 1510 may provide to a ProSe Application Server 1520 a "Create/Update/Delete ED2D group" API an Applicant Layer Group ID (ED2D_ID), which identifies an application layer group that a WTRU belongs to. In some embodiments, the ED2D_ID identifies the multi-RAT D2D application group. As part of the Application Layer Group ID, the following information may also provided: WTRU Application Layer ID; WTRU EPC ID that includes the RED2D device; non-3GPP devices ID such as "IP address" or "MAC address" associated with the ED2DID; ProSe Layer-2 Group ID; and ProSe Group IP multicast address.

At 1502, the ProSe Application Server 1520 may store the mapping and verify whether an RED2D is included. At 1503, the ProSe Application Server 1520 may send the group details to a ProSe Function 1530 for verification. In some embodiments, the ProSe Application Server 1520 may send the group details over PC2 interface. At 1504, the ProSe Function 1530 may identify the Group ID and verify whether there is at least one device which may act as a RED2D. At 1505, the ProSe Function 1530 may send the list of devices to an HSS 1540 to identify a RED2D device. In some embodiments, the ProSe Function 1530 may send the list of devices over a PC4a interface. If the HSS 1540 confirms inclusion of a valid RED2D device, it may send a verification success to ProSe Function 1530 at 1506. At 1507, the ProSe Function 1530 may send success to ProSe Application Server 1520. The ProSe Application Server 1520 may in turn send a Create Success to the Game Controller AF 1510 at 1508.

If the Game Controller AF does not provide any RED2D device, the ProSe Application Server may request the ProSe Function to find if any such device is available. If available and authorized to provide REDE2D service, it may be included in the group. If not, then ProSe Application Server may reject the request.

While creating this enhanced group, the Game Controller AF may provide security credentials for all 3GPP devices (e.g., 5G devices) and non-3GPP devices (e.g., IEEE 802 devices). The ProSe Function may authenticate these devices through the Application Server. It may create a separate mechanism later to authenticate each device while they are allowed to initiate D2D communication.

Figure 16:
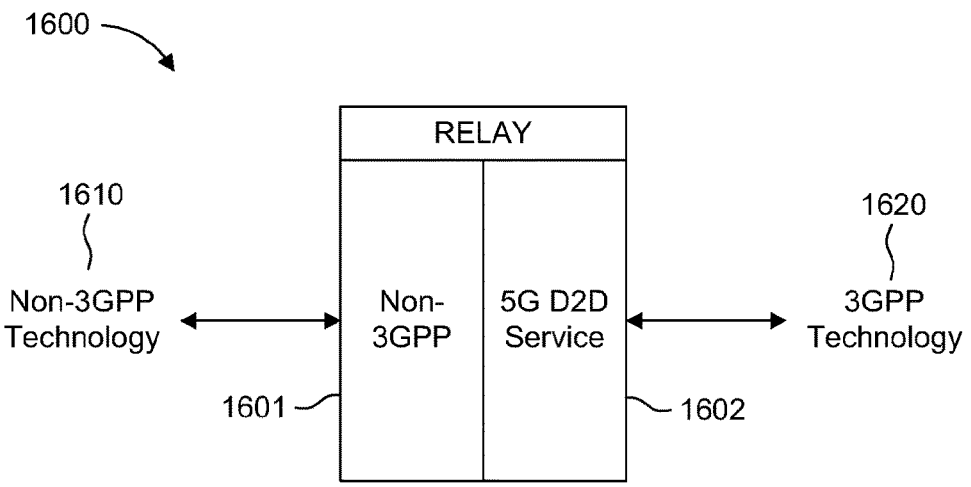
FIG. 16 is a diagram illustrating a RED2D device according to an embodiment.

FIG. 16 is a diagram illustrating a RED2D device 1600 according to an embodiment. RED2D is a new function or ProSe capability. The RED2D device 1600 may act as a relay between 5G technology 1620 and non-3GPP technology 1610. The RED2D device 1600 may support non-3GPP service 1601 and 5G D2D service 1602 for direct communication among 5G devices. The RED2D device 1600 may also comprise a WiFi Direct for direct communication among WiFi enabled devices.

The 5G D2D service may be configured with WiFi devices, which are part of the ED2D group. The WiFi stack in the RED2D device may create a WiFi direct link with another WiFi device or more than one WiFi device.

The RED2D device may support the function, where all 5G D2D communication may be forwarded to the WiFi direct group for direct communication or broadcast with the same being enabled on the reverse side.

In the E-UTRAN attach procedure for ProSe-enabled WTRUs, a ProSe-enabled WTRU may include the ProSe capability indication as part of the "WTRU Network Capability" in the Attach Request message. The MME may store this information for ProSe operation. The ProSe capability may indicate whether the WTRU, which may be a home gateway as well, is capable of supporting one or more of the following ProSe direct services: ProSe Direct Discovery, ProSe Direct Communication, ProSe WTRU-to-Network Relay, and "ProSe Relay for ED2D", which may be used by the 5G WTRU with dual RAT capability to indicate that is may act as a "Relay for ED2D".

Once the MME authorizes, a standard procedure may be applied for this new capability. If the MME is configured to indicate "ProSe authorized" to E-UTRAN, the WTRU is ProSe-enabled, and the WTRU may be authorized to use ProSe direct services based on the subscription data. The MME may include a "ProSe authorized" indication in the S1 AP Initial Context Setup Request, indicating which of the ProSe direct services the WTRU is authorized to use. If the WTRU's "ProSe authorized" status indicates the WTRU is not authorized to act as RED2D, then the eNodeB may not authorize the WTRU to act as a Relay for ED2D.

Figure 17:
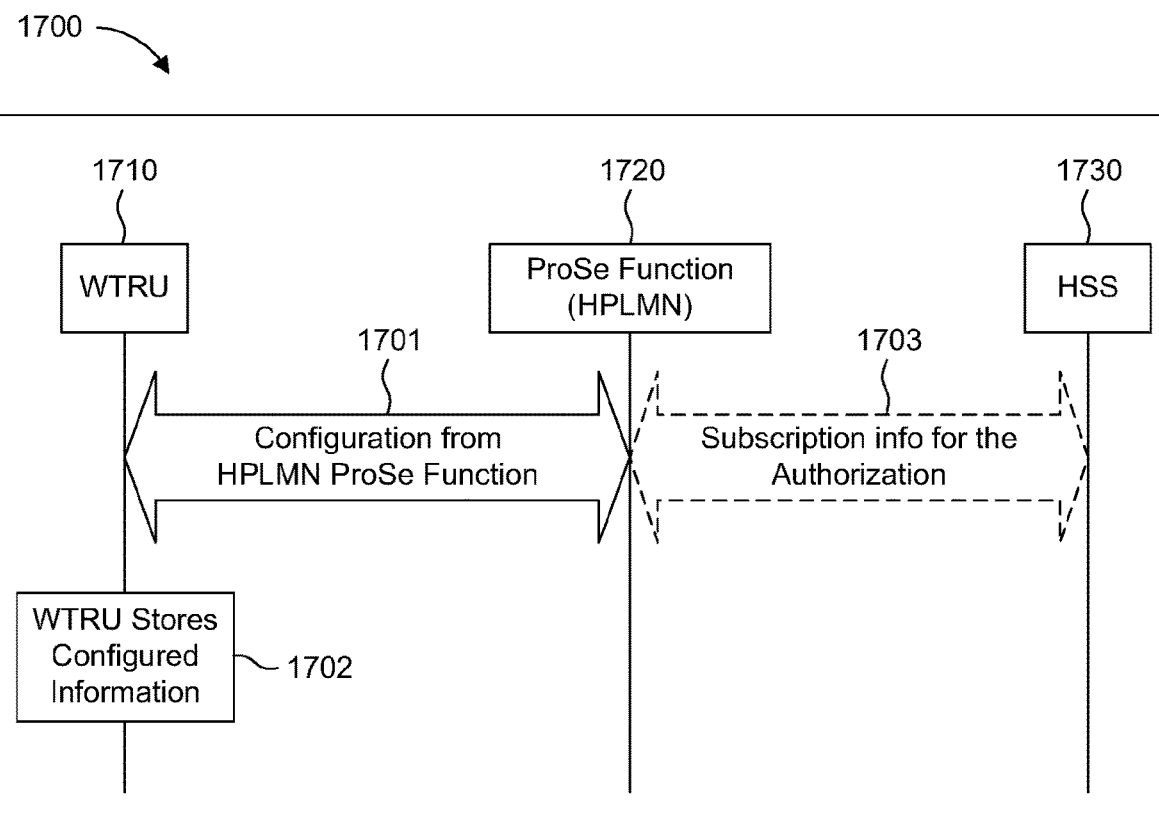
FIG. 17 is a diagram illustrating pre-configuration for ProSe Direct Discovery or ProSe Direct Communication according to an embodiment.

FIG. 17 is a diagram illustrating a pre-configuration for ProSe Direct Discovery or ProSe Direct Communication 1700, according to an embodiment. At 1701, a HPLMN ProSe Function 1720 may pre-configure a WTRU 1710. The WTRU 1710 may store the configured information at 1702. The HPLMN ProSe Function 1720 may also pre-configure a RED2D, with the authorization information for a list of PLMNs where the WTRU 1710 is authorized to perform ProSe Direct Discovery or ProSe Direct Communication. If there is no associated WTRU context, the ProSe Function may get the subscription information for ProSe Direct Discovery and/or ProSe Direct Communication from HSS 1730 at 1703. Based on the pre-configuration, the RED2D may chose the PLMN to register with.

Figure 18:
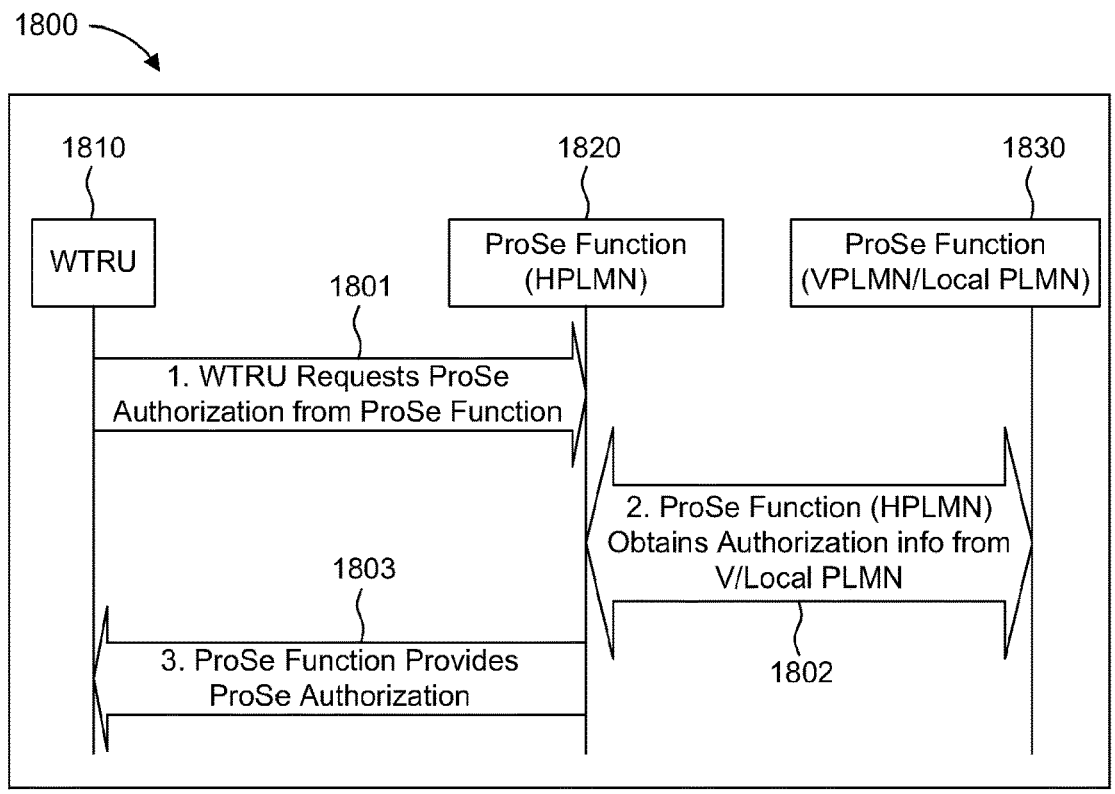
FIG. 18 is a diagram illustrating a service authorization procedure for ProSe Direct Discovery or ProSe Direct Communication according to an embodiment.

FIG. 18 is a diagram illustrating a service authorization procedure for ProSe Direct Discovery or ProSe Direct Communication 1800, according to an embodiment. The RED2D and other 5G WTRUs may get the service authorization for ProSe Direct Discovery, ProSe Direct Communication, or both, with a given validity time, from the HPLMN ProSe Function. In addition, if the WTRU may be authorized to use restricted ProSe Direct Discovery service, the ProSe Function of the HPLMNN assigns a ProSe Discovery WTRU ID and sends it to the WTRU.

The service authorization procedure may be executed before starting the setup of the ProSe Direct Discovery or ProSe Direct Communication if the WTRU has no valid authorization information, when the WTRU already engaged in a ProSe Direct Discovery or ProSe Direct Communication changes its registered PLMN and has no valid authorization information for the new registered PLMN, or when the service authorization expires.

The authorization may be performed using "over IP" mechanisms and only IP connectivity may be required to allow the WTRU to access this ProSe Function.

In FIG. 18, at 1801, the WTRU 1810 may request authorization for Direct Discovery, Direct Communication, both Direct Discovery and Direct Communication, HPLMN, VPLMN, or for Direct Discovery for some local PLMNs from the HPLMN ProSe Function 1820.

At 1802, the HPLMN ProSe Function 1820 may obtain authorization information from local PLMN or VPLMN ProSe Function 1830 and merges with its own policy. At 1803, the HPLMN ProSe Function 1820 may provide authorization information to the WTRU 1810. The authorization information provided to the WTRU 1810 may apply to the serving PLMN and to PLMNs determined by the HPLMN as Local PLMNs (e.g., based on the Serving PLMN) to be available to the WTRU 1810. The WTRU 1810 may store the authorization information obtained from this ProSe Function in a secure way. If needed at any point, the authorization may be revoked by the Local PLMN or VPLMN ProSe Function or HPLMN ProSe Function.

The Local PLMN may not apply for WLAN-based ProSe Direct Discovery. The WTRU may engage in WLAN-based ProSe Direct Discovery as an announcing or monitoring WTRU, regardless of the serving PLMN or other PLMNs that provide E-UTRAN coverage in the WTRU location.

The service authorization may be transferred between the RED2D and the ProSe Function over the PC3 interface with the ProSe Direct Services Provisioning Management Object of the ProSEPublicSafety Direct Services Provisioning Management Object.

Figure 19:
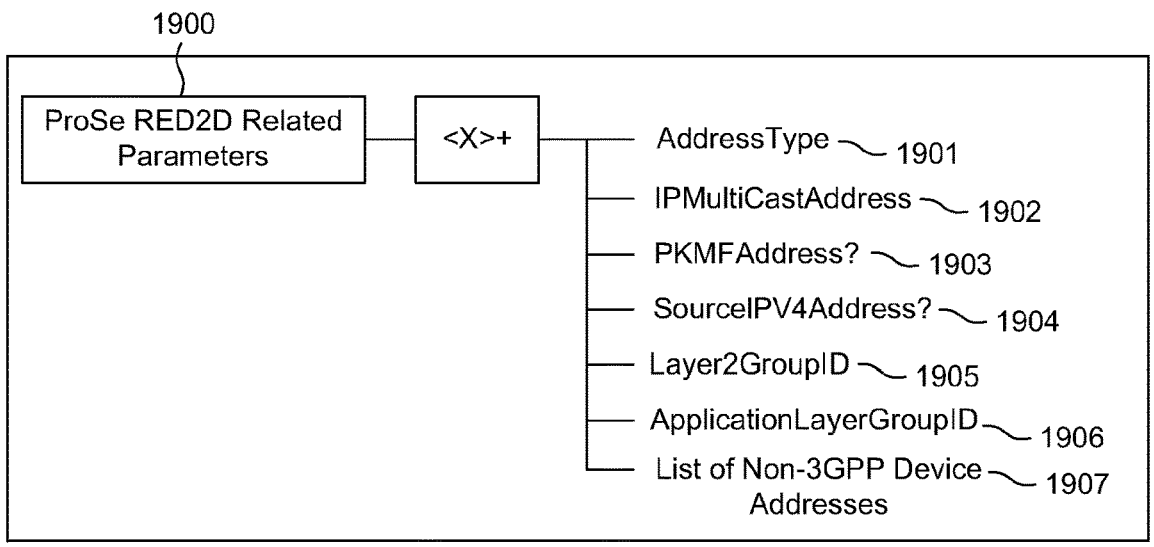
FIG. 19 is a diagram illustrating ProSe RED2D parameters according to an embodiment.

Service authorization provided by the HPLMN ProSe Function for RED2D may include: the list of PLMNs in which RED2D is authorized to use ProSe direct discovery; whether the WTRU is authorized to perform ProSe direct discovery for public safety use when not served by E-UTRAN, and if so, the required radio parameters to be used for ProSe direct discovery for public safety use when not served by E-UTRAN; the group member discovery related parameters; and the ProSe ED2D application and RED2D related parameters, as shown in FIG. 19.

FIG. 19 is a diagram illustrating ProSe RED2D related parameters 1900, according to an embodiment. The ProSe RED2D related parameters 1900, may include, but are not limited to: address type 1901, IPMulticast Address 1902, PKMF Address 1903, SourceIPv4Address 1904, Lay2GroupID 1905, ApplicationLayerGroupID 1906, and a list of non-3GPP device addresses 1907.

Figure 20:
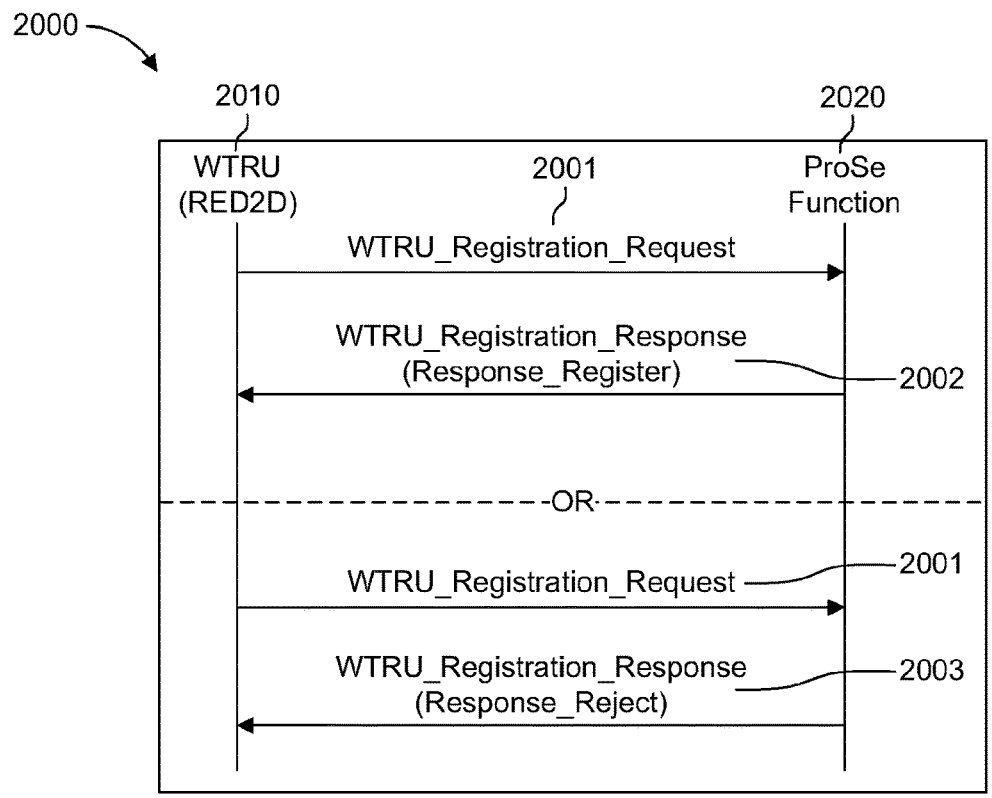
FIG. 20 is a diagram illustrating a RED2D registration procedure according to an embodiment.

FIG. 20 is a diagram illustrating a RED2D registration procedure 2000 according to an embodiment. A WTRU that acts as the RED2D 2010 may register with the ProSe Function 2020 residing in the HPLMN to obtain EPC-level ProSe discovery services. Based on pre-configuration, the RED2D 2010 may be authorized to perform EPC-level ProSe discovery in the registered PLMN. The RED2D 2010 may initiate the registration procedure when triggered by upper layers to obtain EPC-level ProSe discovery services and has no corresponding EPC ProSe User ID. At 2001, the RED2D 2010 may initiate the registration procedure by sending a WTRU_REGISTRATION_REQUEST message to the HPLMN ProSe Function 2020 with the WTRU identity set to the RED2D IMSI.

In order to use EPC/Application support for WLAN direct discovery and communication with other non-3GPP devices, the RED2D 2010 may use a permanent WLAN link layer identifier, SSID, and Device Identifier in the WLAN domain, and include all information in a WTRU_REGISTRATION_REQUEST message.

Upon receiving the WTRU_REGISTRATION_REQUEST message, the ProSe Function 2020 may interact with the HSS in order to authenticate the user/RED2D and check whether the user is authorized to use EPC-level ProSe discovery services corresponding to the IMSI contained in the WTRU_REGISTRATION_REQUEST message in the registered PLMN.

The handling of WTRU_REGISTRATION_REQUEST message from the RED2D 2010 is different from non-RED2D WTRUs. If the RED2D 2010 is authorized to use EPC-level ProSe discovery services, the ProSe Function 2020 may generate an EPC ProSe User ID corresponding to the IMSI contained in the WTRU_REGISTRATION_REQUEST message. The RED2D 2010 may then extract the WLAN Link Identifier, SSID, Device ID, Shared Key (which may be generated by ProSe Application Server), and forward to the ProSe Application Server and then to Game Controller, by sending Initiate_EPC_red2d_WiFi_Direct_Setup ( ). The Game Controller may provide the WiFi direct setup information to other non-3GPP WTRUs through the home gateway/hub.

At 2002, the ProSe Function 2020 may then send WTRU_REGISTRATION_RESPONSE message to the RED2D 2010 containing a <response-register> element with the EPC ProSe User ID. The EPC ProSe User ID is a number generated by the ProSe Function that is unique within the ProSe Function on a per WTRU basis. The <response-register> element may also contain a server-initiated method configuration parameter indicating to the WTRU which method to use to handle server-initiated procedures such as possible WLAN device identifiers, WLAN ranges, possible channels to use, etc. Alternatively, if the RED2D 2010 is not authorized to use EPC-level ProSe discovery services, the ProSe Function 2020 may send a WTRU_REGISTRATION_RESPONSE to the RED2D 2010 containing a <response_reject> element and 2003.

Figure 21:
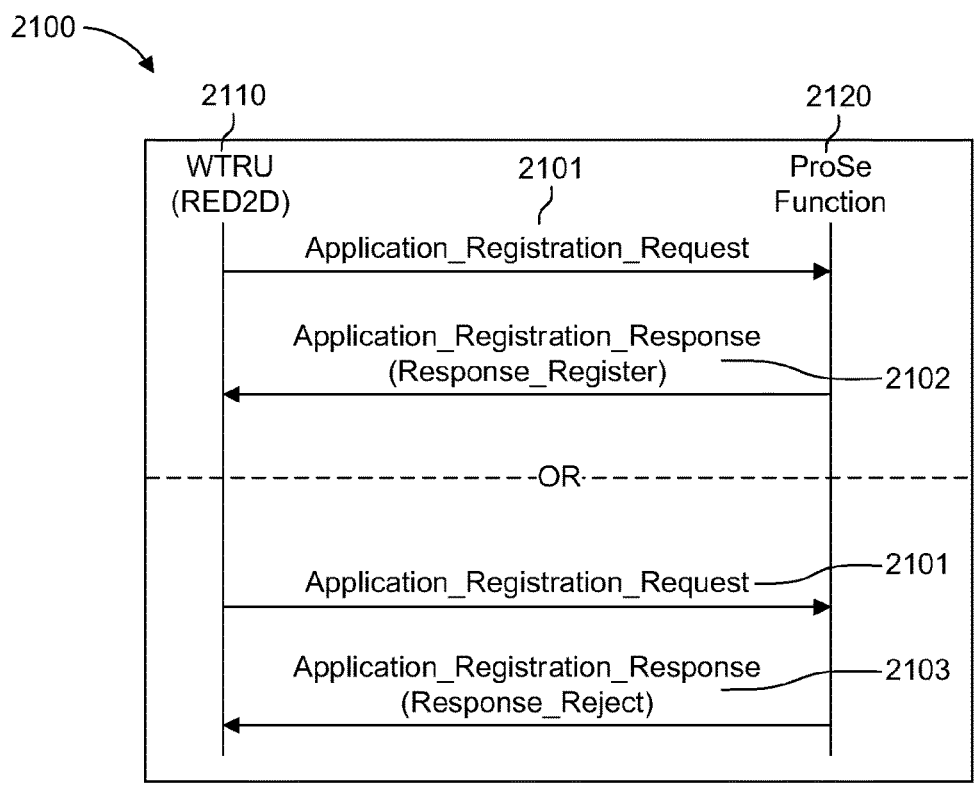
FIG. 21 is a diagram illustrating an application registration procedure according to an embodiment.

FIG. 21 is a diagram illustrating an application registration procedure 2100, according to an embodiment. One purpose of the application registration procedure is for the RED2D to activate EPC-level Prose discovery for ED2D applications.

When the user uses applications on the WTRU, an "Application ID" may be used to identify the corresponding application server platform. When the user registers an application with the application server, the user may be assigned an "Application Layer User ID". If the application requires EPC-level ProSe discovery, the WTRU may be configured with the data structure of the Application IDs and the Application Layer User ID. This may be performed using mechanisms outside the scope of 3GPP.

At 2101, the RED2D 2110 may initiate the application registration procedure by sending an "APPLICATION_REGISTRATION_REQUEST" message to the ProSe Function 2120 by including a new transaction ID, the WTRU's EPC ProSe User ID, the Application ID for the application that is to be registered, and the new user's Application Layer User ID for the application that is to be registered.

Upon receiving an APPLICATION_REGISTRATION_REQUEST message, the ProSe Function 2120 retrieves the user profile based on RED2D's "EPC ProSe User ID" included in the APPLICATION_REGISTRATION_REQUEST message. The RED2D 2110 may also include other WLAN devices/services it detects in the vicinity, WLAN network/domain information, network measurement, and/or network requirements.

The ProSe Function 2120 may check if the list of authorized applications in the user's profile includes the requested application based on the Application ID in the APPLICATION_REGISTRATION_REQUEST message. If the check is successful and it is identified as an authorized ED2D application, the ProSe Function 2120 may send a request to the application server so that the user of the application identified by Application Layer User ID in the APPLICATION_REGISTRATION_REQUEST message can use EPC-level ProSe discovery for that application. The ProSe Function 2120 may also forward application details such as WiFi services/devices visible, domain name, network requirements, network condition, etc. to the ProSe Application Server and Game Controller.

If the user is authorized to use EPC-level ProSe discovery for the specified application, the ProSe Function 2120 may generate one or more allowed range classes corresponding to the Application ID contained in the APPLICATION_REGISTRATION_REQUEST message and one or more range for WLAN devices corresponding to the Application ID contained in the APPLICATION_REGISTRATION_REQUEST message.

The ProSe Function 2120 may send an APPLICATION_REGISTRATION_RESPONSE message at 2102 containing a <response_register> element to the RED2D 2110 with transaction ID set to the value of the transaction ID received in the APPLICATION_REGISTRATION_REQUEST message from the RED2D 2110 and the set of allowed range classes. The set of allowed range classes for each Application ID may be stored in the ProSe Function. It may include RANGE for WLAN devices if available from ProSe Application Server. The APPLICATION_REGISTRATION_RESPONSE may indicate possible application services, network measurements, etc. Alternatively, the ProSe Function 2120 may send an APPLICATION_REGISTRATION_RESPONSE message at 2103 containing a <response_reject> element to the RED2D 2110 if the user is not authorized to use EPC-level ProSe discovery for the specified application.

The operation of RED2D involves configuration of 5G D2D stack, configuration of WiFi stack, and configuration and operation of Relay.

As part of "Service Authorization Procedure" and "Registration Procedure", the DPF send configuration information to the RED2D. DPF is used to provision the WTRU with necessary parameters in order to use Prose Direct Discovery and ProSe Direct Communication. The ProSe Direct Discovery and ProSe Direct Communication by 5G devices may follow the standard procedure. PC3 Control Protocol procedures may be used between the WTRU and the ProSe Function for ProSe direct discovery announcing and monitoring and direct discovery of other ProSe-enabled WTRUs over the PC5 interface.

DPF may provide group information, i.e., Application Layer Group ID to be used for ED2D communication. The "Application Layer Group ID" may be mapped to all the 3GPP devices as well as non-3GPP devices.

The "Application Layer Group ID" may be used by 5G D2D stack to make forwarding decisions inside the RELAY function.

As part of "Service Authorization Procedure" and "Registration Procedure", the DPF may send a list of non-3GPP devices as part of the Application Layer Group ID for ED2D.

The ProSe function may send an indication in "Registration Response" to RED2D that after searching and successful proximity detection it may engage in WLAN direct discovery and communication using WiFi Peer-to-Peer (P2P) technology.

The RED2D devices may non-3GPP stack, extract "Device Information" and initiate creating WiFi direct group. The following information may be received in a Registration Response Message: SSID (the SSID to use for WiFi P2P operation); WLAN Secret Key (the pre-shared key to be used by WTRUs to secure their WiFi P2P communication and is used by WTRU as the Pairwise Master Key (PMK)); P2P Device Address of Self (the WLAN Link Layer ID to be used by WTRU to advertise itself); P2P Device Address of peers (the WLAN Link Layer ID to be used by WTRU to discovery peer WTRUs); operation channel (the channel on which WiFi P2P discovery and communication takes place); and validity time (the time period during which the content provided in the assistance information is valid).

The RELAY function may create a forwarding table per Application Layer Group ID, which maps to a list of 3GPP and non-3GPP devices. An example forwarding table is shown below in Table 1.

TABLE 1

| Application Layer Group ID1 | I/P interface 1: 5G, List of 5G devices | O/P interface 1: WiFi Link |
| Application Layer Group ID1 | I/P interface 2: WiFi, List of non-3GPP devices | O/P interface 2: 5G Link |

In some embodiments, the RED2D may act as RELAY for multiple such ED2D group. In such embodiments, there may be multiple such entries for every Application Layer Group ID.

Once the forwarding table is setup, the RED2D may forward communication received on the 5G access (from 5G devices) to the non-3GPP access side (to non-3GPP devices) in the ED2D group, and vice-versa.

Figure 22:
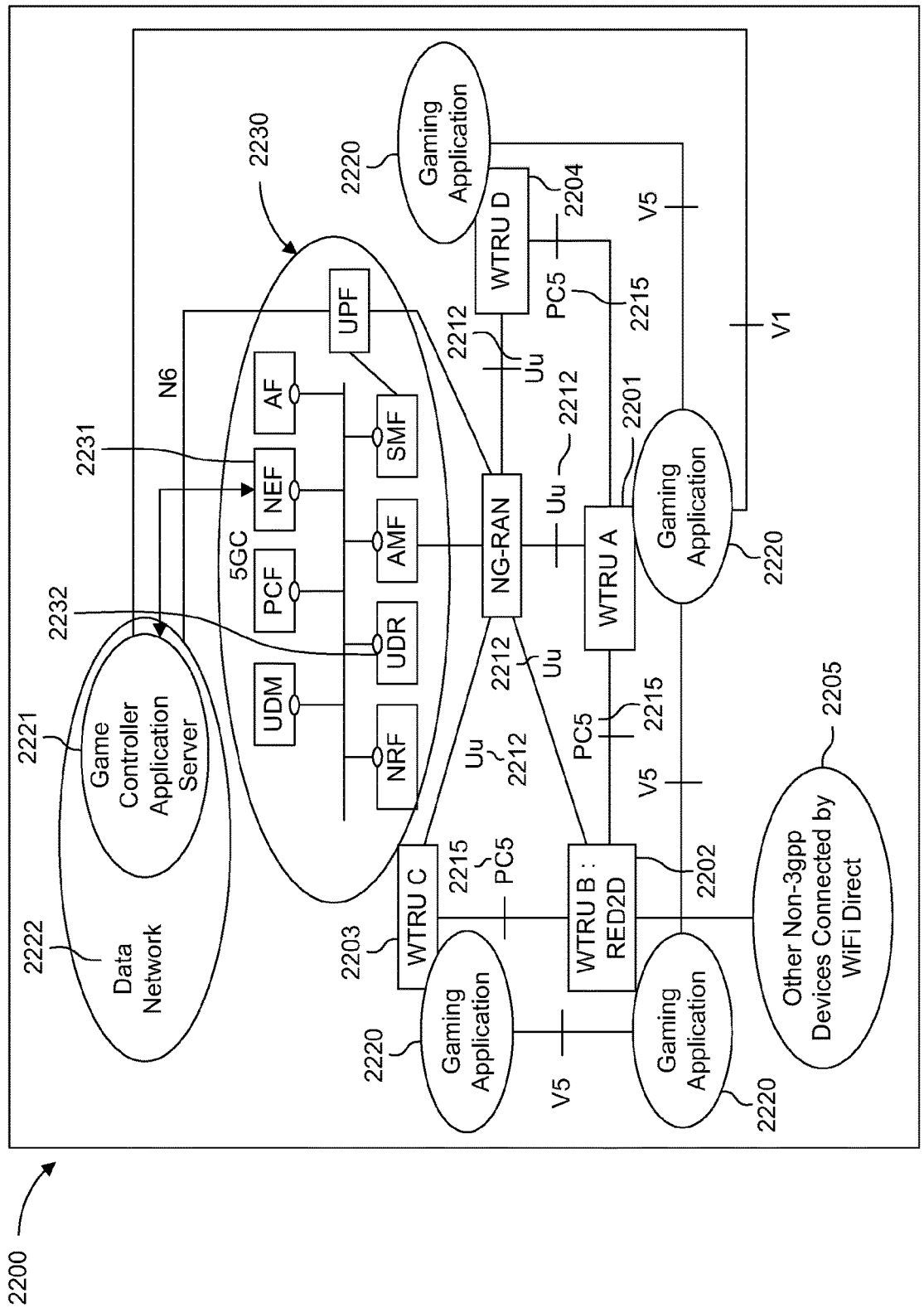
FIG. 22 is a diagram illustrating a Gaming Application using multi-RAT D2D in a 5GS network according to an embodiment.

FIG. 22 is a diagram illustrating a Gaming Application 2200 using multi-RAT D2D in a 5G network, according to an embodiment. In the embodiment illustrated in FIG. 22, there is a first WTRU 2201, a second WTRU 2202, a third WTRU 2203, and a fourth WTRU 2204, each with a gaming application 2220. In FIG. 22, a Game Controller Application Server 2221 in a data network 2222 is the AF responsible for providing application details and configuration information to a NEF 2231 of the 5G CN 2230. The NEF 2231 may store the information in UDR 2232. The second WTRU 2202 is shown as the RED2D device, which has Uu 2212 and PC5 2215 connection. It may connect the non-3GPP devices 2205 connected by WiFi direct using non-3GPP technology.

Figure 23:
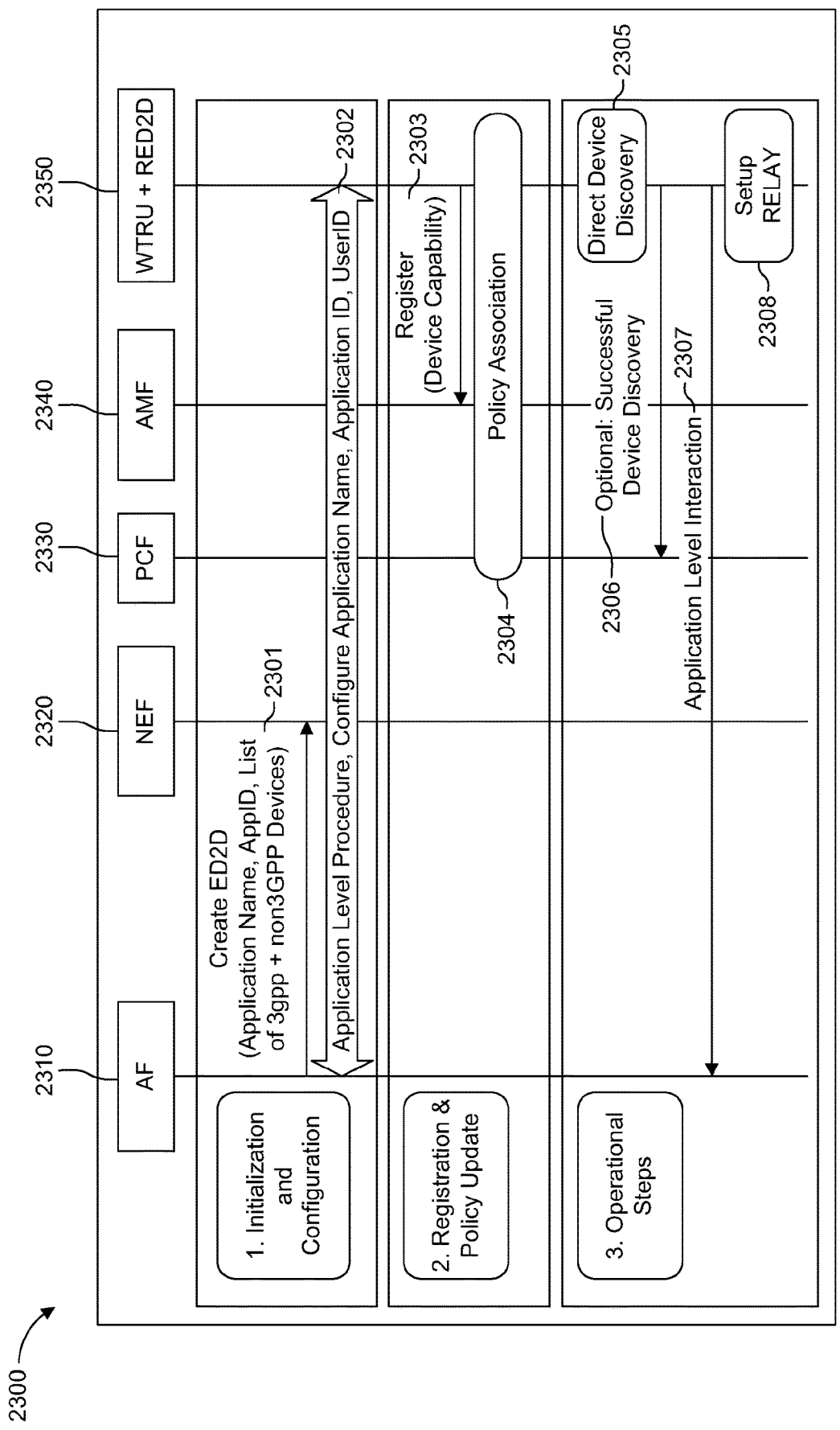
FIG. 23 is a diagram illustrating the procedure for setting up a multi-RAT ED2D group in 5G according to an embodiment.

FIG. 23 is a diagram illustrating a procedure 2300 for setting up a multi-RAT ED2D group in 5G, according to an embodiment. The procedure illustrated in FIG. 23 includes the interactions and messaging between the AF 2310, NEF 2320, PCF 2330, AMF 2340, and the 5G WTRU with the RED2D functionality (the RED2D) 2350. In some embodiments, the AF 2310 may be a Game Controller AF.

At 2301, the AF 2310 provides the NEF 2320 with a list of 3GPP devices and non-3GPP devices which are willing to interact directly or form a multicast group using D2D using "Create ED2D Group". In this list of devices there may be one device with dual capability named RED2D. This group of devices may be designated an "Enhanced D2D Group" and may be associated with a Group ID.

The PCF 3230 may store the Application Name (i.e., Enhanced D2D Group) and the Application ID. The NEF 2320 may store this information in UDR. The NEF 2320 and UDR may validate the request for accuracy.

The pre-designed PCF 2330, which may handle ED2D service, may obtain ED2D information from UDR. The Game Controller AF 2310 provides information with "Create ED2D group" API to NEF 2320. In some embodiments, the Game Controller AF 2310 may provide the Application Layer Group ID (ED2D_ID), which identifies an application layer group that the WTRU belongs to. For example, ED2D_ID identifies the multi-RAT D2D application group.

In some embodiments, the WTRU Application Layer ID is provided as part of the Application Layer Group ID. The WTRU Application Layer ID may identify the user in the context of specification application. It may be encoded as a bit string, such as Device1Ed2d. In some embodiments, the WTRU ID is provided as part of the Application Layer Group ID. The WTRU ID may include the RED2D device. The WTRU ID may be the IMSI, which is not required to be provided during initial configuration, but may be populated during the Application Registration Procedure. In some embodiments, a non-3GPP device ID such as "IP address" or "MAC address" associated with the ED2D may be provided as part of the Application Layer Group ID. In some embodiments, Layer-2 Group ID (ProSe Layer-2 Group ID) may be provided as part of the Application Layer Group ID. The Layer-2 Group ID may be a layer-2 group identifier that may be used to address a set of users at the 3GPP lower layers. This ID may need to be configured in the WTRU before enabling one-to-many ProSe Direct Communication. The ID may be a string and may identify the non-3GPP devices to which the RED2D may connect. In some embodiments, the group IP multicast address is provided as part of the Application Layer Group ID.

At 2302, the Game Controller AF 2310 may provide all the devices in the ED2D group with the Application Name, Application Identifier, and any shared key over user plane. In some embodiments, the Game Controller AF 2310 provides this information to the devices in the ED2D group using V1/V5 interface.

At 2303, as part of Application Registration, the RED2D 2350 may send its own WLAN Link Identifier, SSID (its own provisioned SSID and other SSIDs available/visible to RED2D at that location), Device ID, and Shared Key, which may be generated by the AF.

The RED2D 2350 device may register with 5GS using 3GPP messages and provides ED2D capability information. The AMF may discover the designated PCF 2330, which may handle ED2D service. The AMF 2340 may establish policy association with the PCF 2330. As part of policy association, the PCF 2330 may provide devices with ED2D information and instruct the devices to start direct discovery of the other devices in the group, which may include one or more RED2D devices.

The RED2D 2350 may indicate in the Registration Request Message, WTRU_Registration_Request (ED2D Capability), that it has RED2D capability and is authorized to provide such service based on subscription data.

The AMF 2340 may discover the designated PCF 2330, which can handle ED2D service. At 2304, the AMF 2340 may establish a WTRU policy association with the PCF 2330 for Gaming Application and ED2D Policy/Parameter delivery. The AMF 2340 may select the PCF 2330, which may support ED2D application, such as Gaming Application, and ED2D Policy/Parameter provisioning. The PCF 2330, which supports ED2D application, may be selected by AMF 2340 for other AFs, which need ED2D service.

As part of Policy/Parameter delivery, the PCF 2330 may provide the RED2D 2350 the WTRU Policy container during the WTRU Configuration Update Procedure. The WTRU Policy Container may include 3GPP devices part of ED2D, WLAN device identifiers/L2 identifiers, SSID to use, WLAN ranges, possible WLAN channels, etc. At 2305, the RED2D 2350 may also be instructed to start Direct Device Discovery using Model A or Model B marked as mandatory for the application. At 2306, after all listed 3GPP devices have been discovered, the RED2D 2350 may inform the AF 2310 of successful device discovery using Application Level Interaction at 2307. At 2308, the RED2D 2350 may setup a RELAY function between 3GPP 5G and WLAN direct communication. Alternatively, the RED2D 2350 may inform the PCF 2330 about success or failure of the discovery operation. If the RED2D 2350 is not able to discover all the devices in the list, it may flag such to the PCF 2330 through the AMF 2340. The PCF 2330 may either cancel the service or retry.

Figure 24:
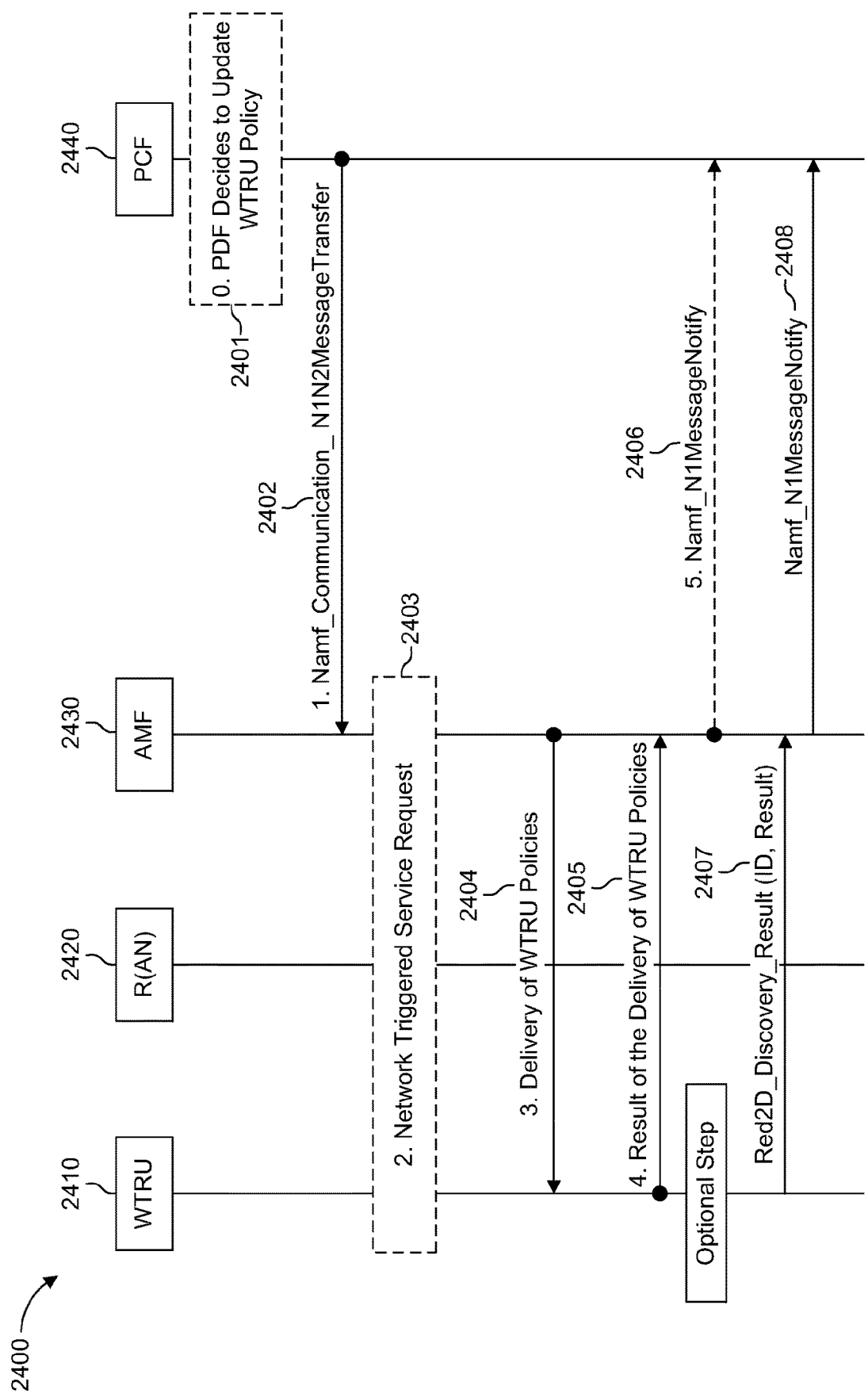
FIG. 24 is a diagram illustrating a WTRU Configuration Update procedure for transparent WTRU policy delivery according to an embodiment.

FIG. 24 is a diagram illustrating a WTRU Configuration Update procedure 2400 for transparent WTRU policy delivery, according to an embodiment. At 2401, the PCF 2440 decides to update the WTRU policy. At 2402, a message (Namf_Communication_N1N2MessageTransfer) may be sent from the PCF 2440 to the AMF 2430. At 2403, a network triggered service request may be provided. At 2404, the AMF 2430 may deliver WTRU policies to the RED2D 410. At 2405, the RED2D 2410 may send the result of the delivery WTRU policies to the AMF 2430. At 2406, a message (Namf_N1MessageNotify) may be sent from the AMF 2430 to the PCF 2440. However, the WTRU Configuration Update Procedure may be handled in different ways. For example, between 2404 and 2405, the RED2D may go into discovery mode. It may try to discover other WTRUs for a set time and then send the result (RED2D_DISCOVERY_RESULT [ID, SUCCESS/FAILURE]) back as part of 2405. Alternatively, after 2405, a new message (RED2D_DISCOVERY_RESULT [ID, SUCCESS/FAILURE]) 2407 may be introduced from the RED2D 2410 to the AMF 2430, indicating if all WTRUs have been discovered successfully. The AMF may inform the PCF 2440 about the result in another NOTIFY message (Namf_N1MessageNotify) 2408.

In a successful WiFi direct setup with non-3GPP devices, RED2D may also attempt to setup WiFi direct group with non-3GPP devices using the SSID and Device ID provided by PCF. It may report back about the WiFi direct group setup to PCF or AF. PCF/AF may decide next action based on the result of the operation.

Once the 3GPP devices are discovered and WiFi direct has been setup, the RED2D may set up the RELAY function between 3GPP 5G and WLAN direct communication.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a wireless transmit/receive unit (WTRU) for establishing device-to-device (D2D) communication, the method comprising:
   registering with a network, the WTRU as having enhanced device-to-device (ED2D) functionality including multi-radio access technology (multi-RAT) support and configurability to serve as a relay ED2D (RED2D) between the network and one or more wireless D2D-enabled devices;
   receiving, via the network, authorization of the WTRU to serve as the RED2D between the network and a group of devices, wherein the group of devices comprises at least one D2D-enabled wireless device from a first category of devices using a 3GPP radio access technology and at least one D2D-enabled wireless device from a second category of devices using non-3GPP radio access technology;
   receiving, via the network, group related information comprising identities of devices in an authorized group of devices and a related group ID; and
   configuring by the WTRU, D2D communication among the authorized group of devices associated with the group ID.

2. The method of claim 1, wherein configuring D2D communication comprises: configuring a relay function for communication between the at least one device of the first category associated with the group ID and the at least one device of the second category associated with the group ID.

3. The method of claim 1, wherein configuring D2D communication comprises: establishing WLAN direct communication with the at least one device of the second category and associated with the group ID; and
   establishing a relay function between the WLAN direct communication and the network using 3GPP radio access technology.

4. The method of claim 3, further comprising initializing a security function required by the network for any device of the second category.

5. The method of claim 1, further comprising initiating direct device discovery of the at least one device using 3GPP radio access technology.

6. The method of claim 1, further comprising receiving, from an Access and Mobility Management Function (AMF), an updated WTRU policy.

7. The method of claim 1, wherein the group of devices comprises devices with one or more gaming applications.

8. The method of claim 1 wherein authorization is provided from an application function (AF).

9. The method of claim 8, wherein the AF a is Game Controller Application Server.

10. The method of claim 1 wherein group related information is provided from a policy control function (PCF).

11. A wireless transmit/receive unit (WTRU) comprising:
    a transmitter configured to transmit a registration message to a network, wherein the registration messages indicates the WTRU as having enhanced device-to-device (ED2D) functionality including multi radio access technology (multi-RAT) and configurable to serve as a relay ED2D (RED2D) for one or more wireless D2D-enabled devices;
    a receiver configured to receive authorization via the network, for the WTRU to serve as the RED2D for a group of devices comprising at least one D2D-enabled wireless device of a first category of devices using 3GPP radio access technologies and at least one D2D-enabled wireless device of a second category of devices using non-3GPP radio access technologies;
    the receiver further configured to receive group related information including identities of devices authorized to form the group of devices and a related group ID; and a processor configured to set up D2D communication among the group of devices associated with the group ID.

12. The WTRU of claim 11, wherein setting up D2D communication comprises configuring a relay function for communication between the at least one device of the first category and associated with the group ID and the at least one device of the second category and associated with the group ID.

13. The WTRU of claim 11, wherein setting up D2D communication comprises: establishing wireless local area network WLAN direct communication among two or more devices of the second category and associated with the group ID; and establishing a relay function between the WLAN direct communication and a device of the first category and associated with the group ID.

14. The WTRU of claim 13, wherein the processor is further configured to initialize any security function for the two or more devices of the second category.

15. The WTRU of claim 11, wherein the processor is further configured to initiate direct device discovery of 3GPP devices.

16. The WTRU of claim 11, wherein the receiver is further configured to receive from an Access and Mobility Management Function (AMF), an updated WTRU policy.

17. The WTRU of claim 11 wherein an application function (AF) authorization provides the received authorization.

18. The WTRU of claim 17, wherein the WTRU includes one or more gaming applications.

19. The WTRU of claim 18, wherein the Application Function is a Game Controller Application Server.

20. The WTRU of claim 11 wherein the group related information is provided from a policy control function (PCF).

* * * * *